United States Patent
Zhidkov

(10) Patent No.: US 7,630,448 B2
(45) Date of Patent: Dec. 8, 2009

(54) IMPULSE NOISE REDUCTION TO AN MCM SIGNAL

(75) Inventor: Sergey Zhidkov, Izhevsk (RU)

(73) Assignee: Samsung Electronics Co., Ltd., Gyeonggi-do (KR)

(*) Notice: Subject to any disclaimer, the term of this patent is extended or adjusted under 35 U.S.C. 154(b) by 897 days.

(21) Appl. No.: 10/806,459

(22) Filed: Mar. 23, 2004

(65) Prior Publication Data

US 2005/0213692 A1 Sep. 29, 2005

(30) Foreign Application Priority Data

Jul. 22, 2003 (KR) .................. 10-2003-0050266

(51) Int. Cl.
H04K 1/10 (2006.01)

(52) U.S. Cl. ............................. 375/260

(58) Field of Classification Search ........ 375/346, 375/260, 144, 148, 261, 262, 348; 370/208, 370/210; 708/403, 404
See application file for complete search history.

(56) References Cited

U.S. PATENT DOCUMENTS

| | | | | |
|---|---|---|---|---|
| 5,410,264 A | * | 4/1995 | Lechleider | 327/311 |
| 5,425,050 A | * | 6/1995 | Schreiber et al. | 375/141 |
| 5,692,010 A | * | 11/1997 | Nielsen | 375/232 |
| 5,694,389 A | * | 12/1997 | Seki et al. | 370/208 |
| 5,802,117 A | * | 9/1998 | Ghosh | 375/344 |
| 5,867,539 A | * | 2/1999 | Koslov | 375/346 |
| 5,956,372 A | * | 9/1999 | Vaman et al. | 375/260 |
| 6,047,022 A | * | 4/2000 | Reuven | 375/222 |
| 6,763,061 B1 | * | 7/2004 | Strait et al. | 375/219 |
| 6,771,591 B1 | * | 8/2004 | Belotserkovsky et al. | 370/210 |
| 6,920,194 B2 | * | 7/2005 | Stopler et al. | 375/349 |
| 6,956,893 B2 | * | 10/2005 | Frank et al. | 375/147 |
| 7,212,569 B1 | * | 5/2007 | Clark | 375/233 |
| 2002/0061081 A1 | * | 5/2002 | Richards et al. | 375/346 |
| 2003/0043925 A1 | | 3/2003 | Stopler et al. | |
| 2003/0099287 A1 | * | 5/2003 | Arambepola | 375/227 |

FOREIGN PATENT DOCUMENTS

EP 1011235 9/1999

(Continued)

OTHER PUBLICATIONS

Hamid Saeedi, Masoud Sharid, Farokh Marvasti, Clipping noise Cancellation in OFDM Systems Using Oversampled Signal Reconstruction, Feb. 2002, IEEE Communications Letters vol. 6 No. 2, pp. 73-75.*

(Continued)

*Primary Examiner*—Young T. Tse
(74) *Attorney, Agent, or Firm*—Harness, Dickey & Pierce, P.L.C.

(57) ABSTRACT

A method reduces noise in a multiple carrier modulated (MCM) signal. Such a method may include: estimating impulse noise based in the equalized signal; and removing a portion of the noise in the equalized signal as a function of the estimated impulse noise. An apparatus reduces noise in the MCM. Such an apparatus may include: a down-converter; an analog to digital converter to digitize the output of the down-converter; a guard-interval removing unit operable upon the digitized output of the down-converter; and a combined FFT, equalization and impulse-noise-compensation unit operable upon a signal from the guard-interval-removing unit.

46 Claims, 17 Drawing Sheets

FOREIGN PATENT DOCUMENTS

| | | |
|---|---|---|
| EP | 1043874 | 4/2000 |
| EP | 1011235 A2 * | 6/2000 |
| EP | 1043874 A2 * | 10/2000 |
| EP | 1178642 A2 | 2/2002 |
| EP | 1178642 A2 * | 6/2002 |
| GB | 2 388 500 A | 11/2003 |
| WO | WO 00/52892 A1 * | 9/2000 |

OTHER PUBLICATIONS

Martin Toeltsh, Andreas Molisch, Equalization of OFDM-Systems by Interference Cancellation Techniques 2001, IEEE International Conference on Communications vol. 6: pp. 1950-1954.*

Korean Notice of Office Action dated Jun. 28, 2005 with English translation.

M. Toeltsch, et al., "Equalization of OFDM-Systems by Interference Cancellation Techniques," Institute for Message Technology and High-frequency Engineering, Technical University, Vienna, Austria, 5 pgs.

H. Saeedi, "Clipping Noise Cancellation in OFDM Systems Using Oversampled Signal Reconstruction," Communications Letters, (Feb. 2002), 6:2:73-75.

Notice of Office Action (First Office Action) issued on Dec. 5, 2008, by the Chinese State Intellectual Property Offfice ("SIPO") for corresponding Chinese Application No. 2004100794021.

M. Toeltsch, et al., "Equalization of OFDM-Systems by Interference Cancellation Techniques," Institute for Message Technology and High-frequency Engineering, Technical University, Vienna, Austria, 5 pgs., 2001.

* cited by examiner

IMPULSE NOISE REDUCTION TO AN MCM SIGNAL

BACKGROUND OF THE PRESENT INVENTION

Multiple carrier modulation (MCM) techniques, e.g., orthogonal frequency division multiplexing (OFDM), are generally known.

Like other communication techniques, a received MCM (again, e.g., OFDM) signal is subject to noise introduced between the transmitter and the receiver. This noise includes additive white Gaussian noise (AWGN) and impulse noise. Typically, non-negligible impulse noise sources are electronic devices near the receiver that exhibit large local magnetic fields induced by switching large amounts of current, e.g., during energization of: motors that move an elevator carriage; motors and/or an exposure device in a photocopier machine, etc.

It is known to estimate (and attempt to remove) impulse noise content in the received multi-carrier-modulated (MCM) signal prior to the signal being equalized (a "pre-EQ signal). FIG. 1 is a block diagram depicting a typical MCM system 100 that includes components for removing impulse noise from a pre-EQ signal, according to the Background Art. For simplicity, only a portion of the system 100 is depicted, as is indicated by the ellipses ( . . . ).

In more detail, system 100 includes the following serially-connected components: a down converter 126; a clipping unit 101; and a guard-interval removing unit 130. Clipping unit 101 includes: a variable gain amplifier 180; a clipping device 182; an analog-to-digital converter (ADC) 184; a feedback loop formed of a power estimation unit 186 operating upon the output of ADC 184; and a threshold calculation unit 188 that operates upon the power estimate from unit 186 and provides a threshold control signal to amplifier 180. Details concerning FIG. 1 can be found in published European patent application, publication No. EP 1011235. Magnitudes of the pre-EQ signal greater than what is typically expected are detected and either clipped to a threshold level by clipping device 182, or to zero (e.g., published European patent application, publication No. EP 1043874).

SUMMARY OF THE PRESENT INVENTION

At least one of the embodiments of the present invention is directed to a method of reducing noise in a multiple carrier modulated (MCM) signal. Such a method may include: estimating impulse noise based in the equalized signal; and removing a portion of the noise in the equalized signal as a function of the estimated impulse noise.

At least one other of the embodiments of the present invention is directed to an apparatus for reducing noise in a multi-carrier-modulated (MCM) signal, the apparatus comprising: a down-converter; an analog to digital converter to digitize the output of the down-converter; a guard-interval removing unit operable upon the digitized output of the down-converter; and a combined FFT, equalization and impulse-noise-compensation unit operable upon a signal from the guard-interval-removing unit.

Additional features and advantages of the present invention will be more fully apparent from the following detailed description of example embodiments and the accompanying drawings.

The other drawings are: intended to depict example embodiments of the present invention and should not be interpreted to limit the scope thereof.

Figure 1:
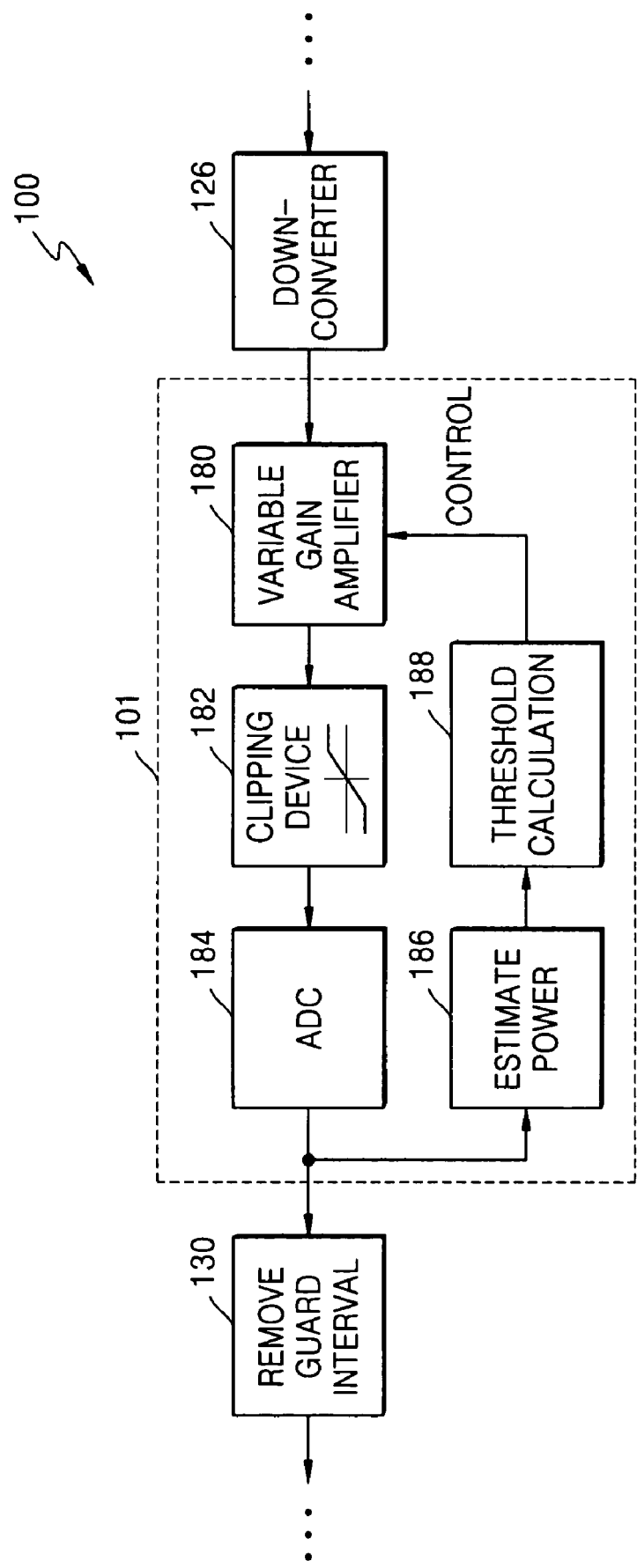
FIG. 1 is a block diagram depicting a typical MCM system for pre-EQ impulse-noise removal, according to the Background Art.
Figure 2:
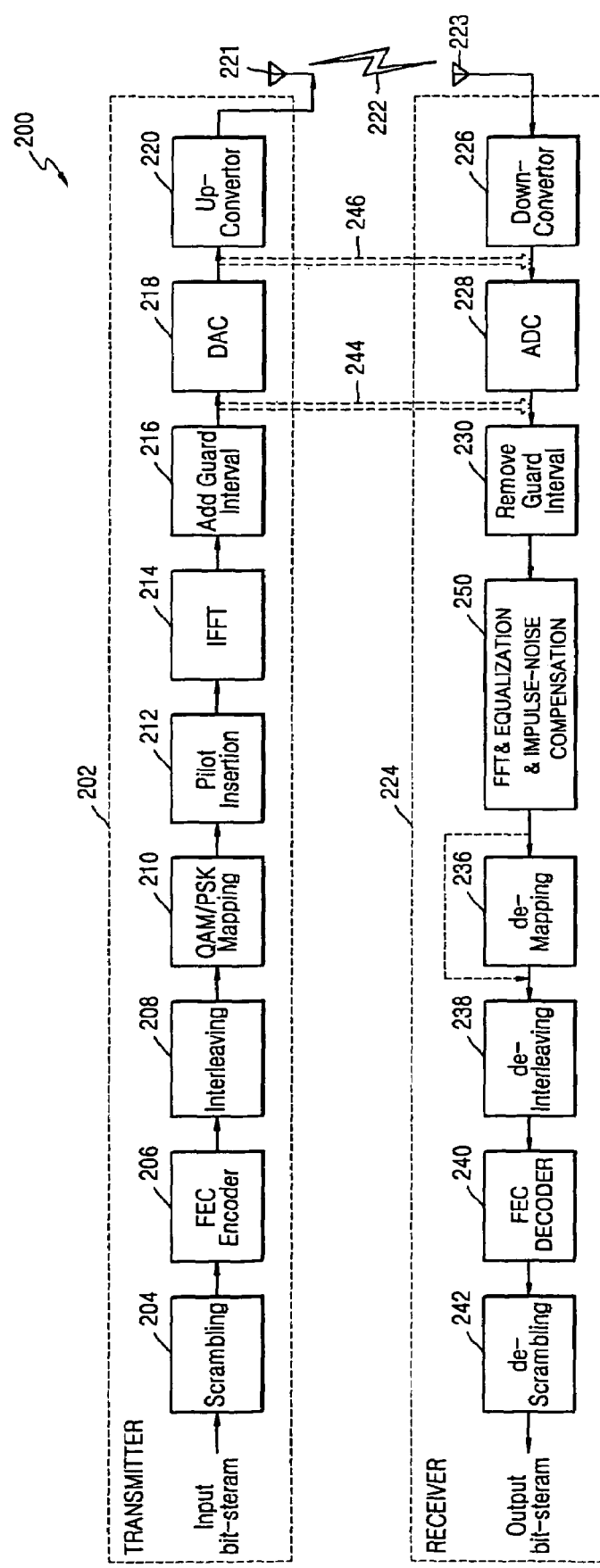

FIG. 2 is a block diagram depicting an MCM system according to at least one embodiment of the present invention.

Figure 3:
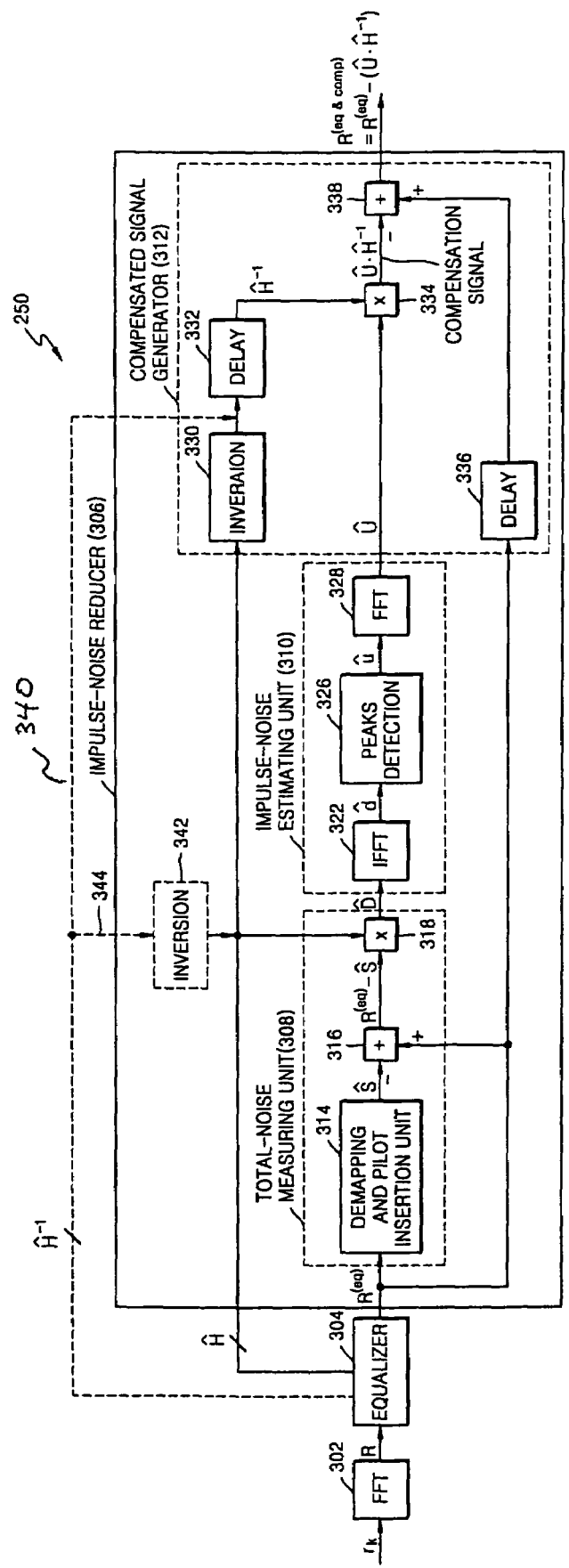

FIG. 3 is a more detailed block diagram of the combined FFT_&_Equalization_&_Impulse-Noise-Compensation unit of FIG. 2, according to at least one embodiment of the present invention.

Figure 4:
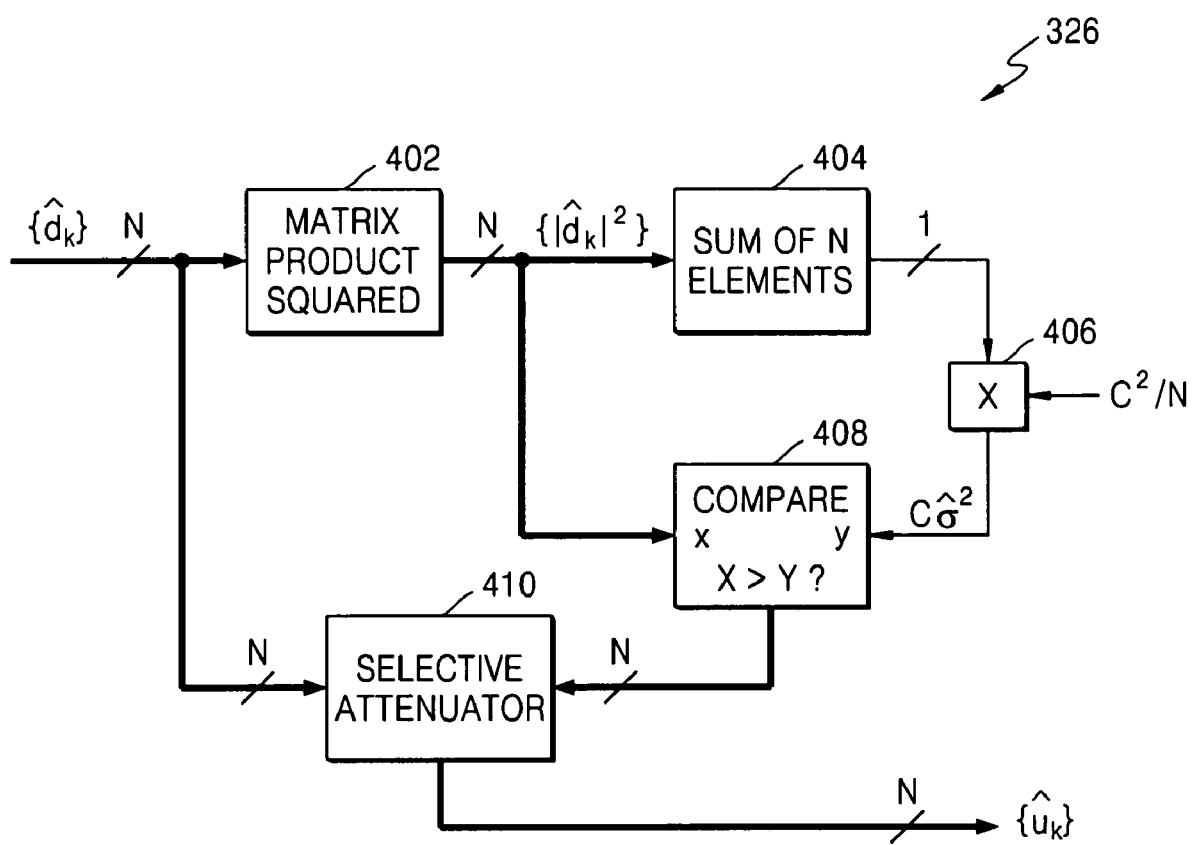

FIG. 4 is a more detailed block diagram of the peaks-detection unit of FIG. 3, according to at least one embodiment of the present invention.

Figure 5:
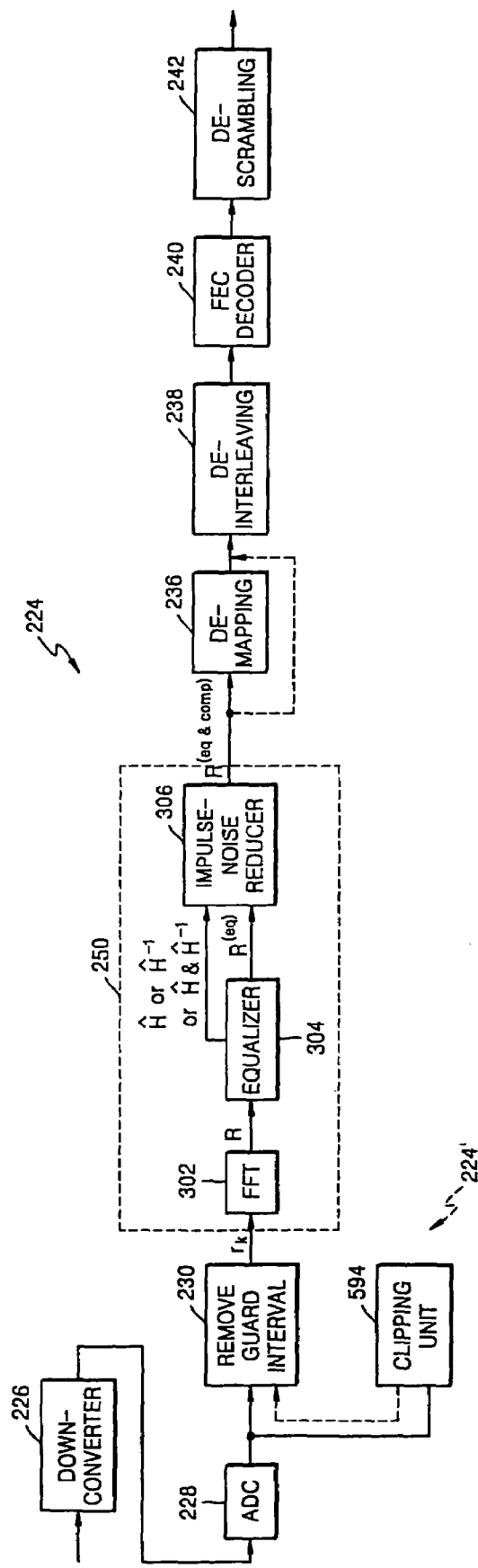

FIG. 5 is a block diagram of receiver, at a level of detail between that of FIGS. 2 and 3, according to at least one embodiment of the present invention.

Figure 6:
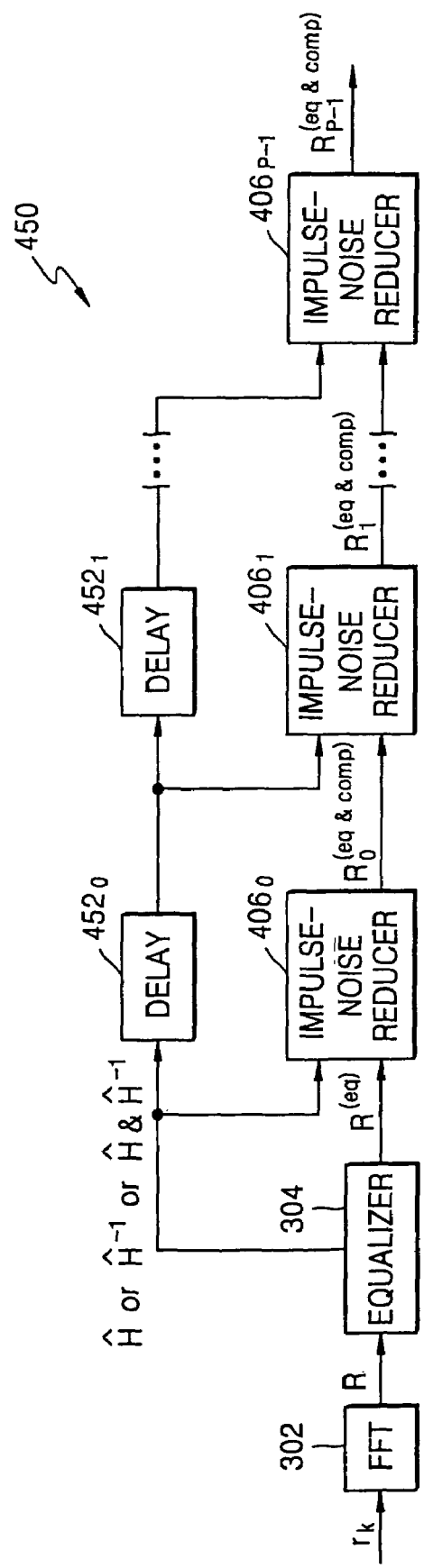

FIG. 6 is a block diagram of an FFT_&_Equalization_&_Impulse-Noise-Compensation unit 450, according to according to at least one embodiment of the present invention.

Figure 7A:
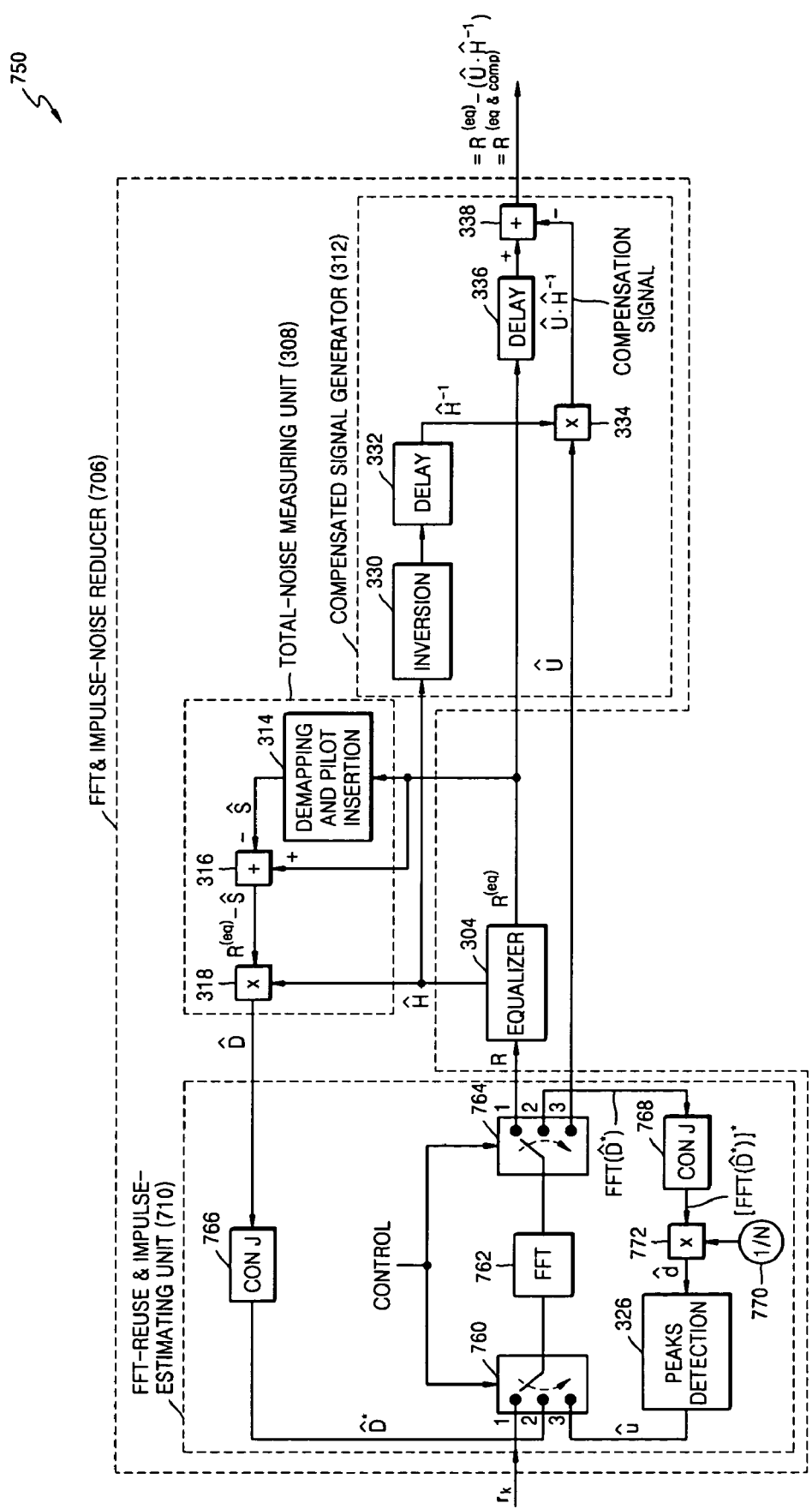

FIG. 7A is a block diagram of an FFT_&_Equalization_&_Impulse-Noise-Compensation unit according to at least one embodiment of the present invention.

Figure 7B:
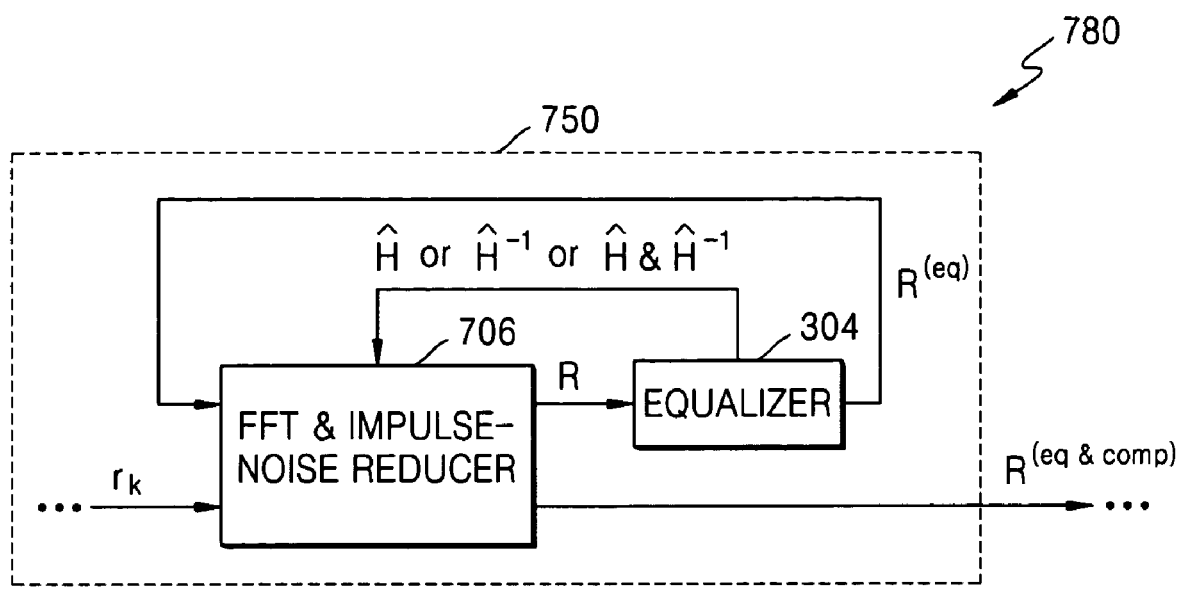

FIG. 7B is a block diagram visual-summary of a receiver, related to FIG. 7A that corresponds to FIG. 5, according to at least one embodiment of the present invention.

Figure 8A:
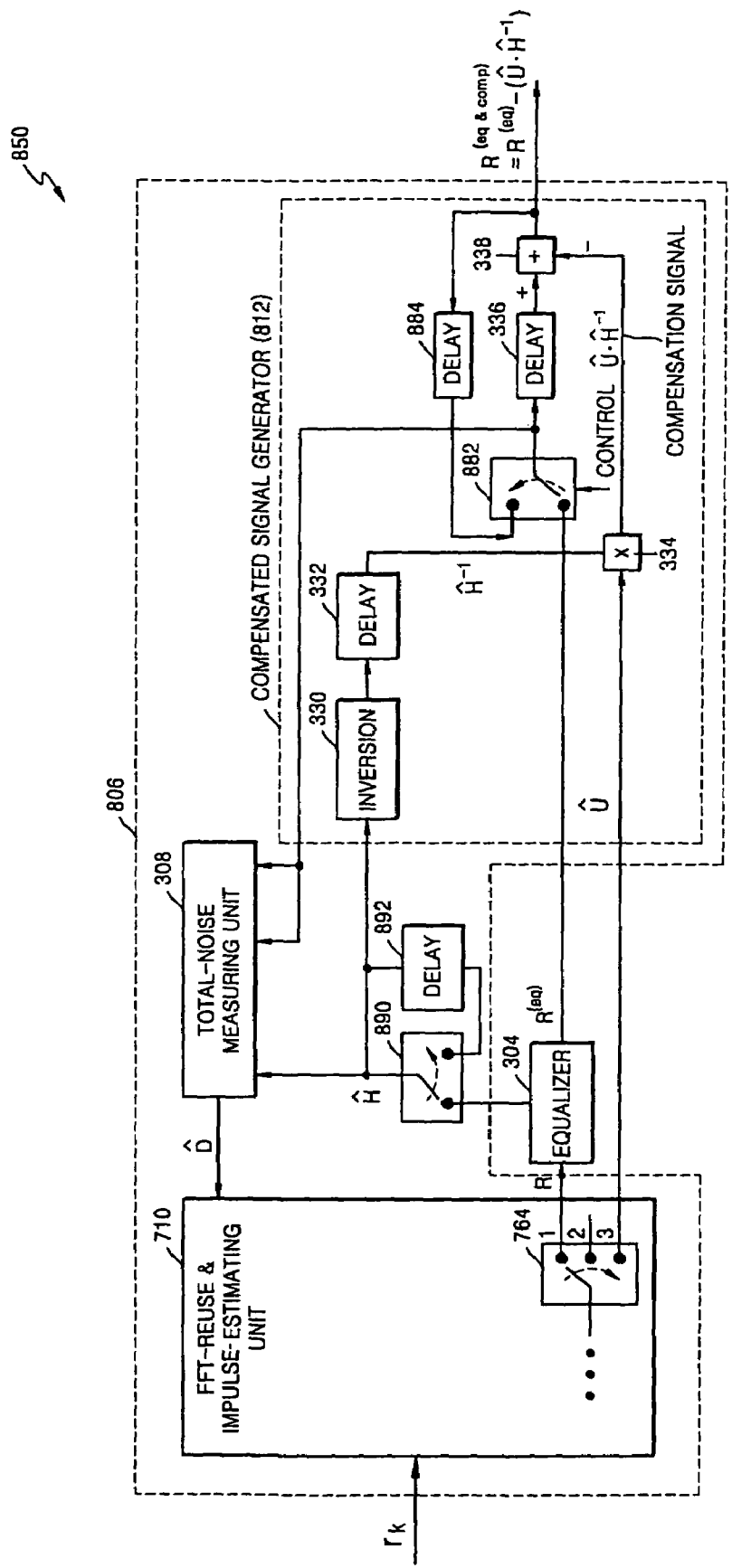

FIG. 8A is a block diagram of a FFT_&_Equalization_&_Impulse-Noise-Compensation unit according to at least one embodiment of the present invention.

Figure 8B:
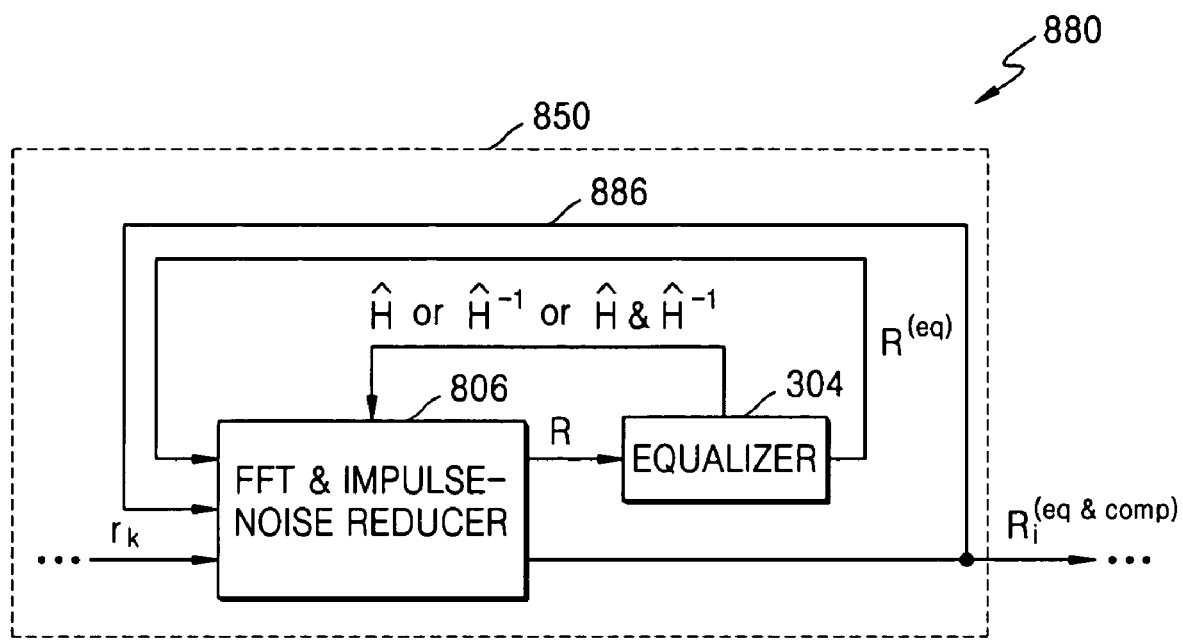

FIG. 8B is a block diagram visual-summary of a receiver related to FIG. 8A that corresponds to FIG. 7B.

Figure 9A:
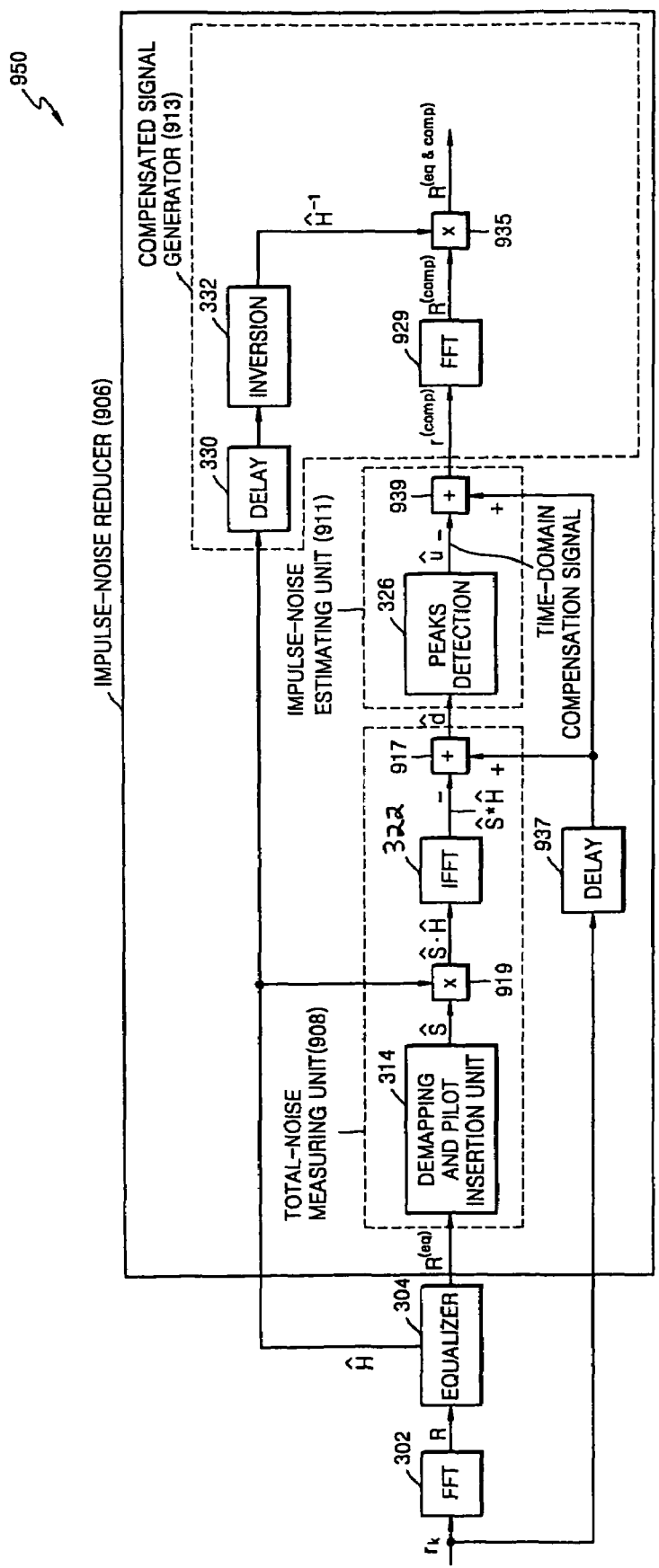

FIG. 9A is a block diagram of a FFT_&_Equahization_&_Impulse-Noise-Compensation unit according to at least one embodiment of the present invention.

Figure 9B:
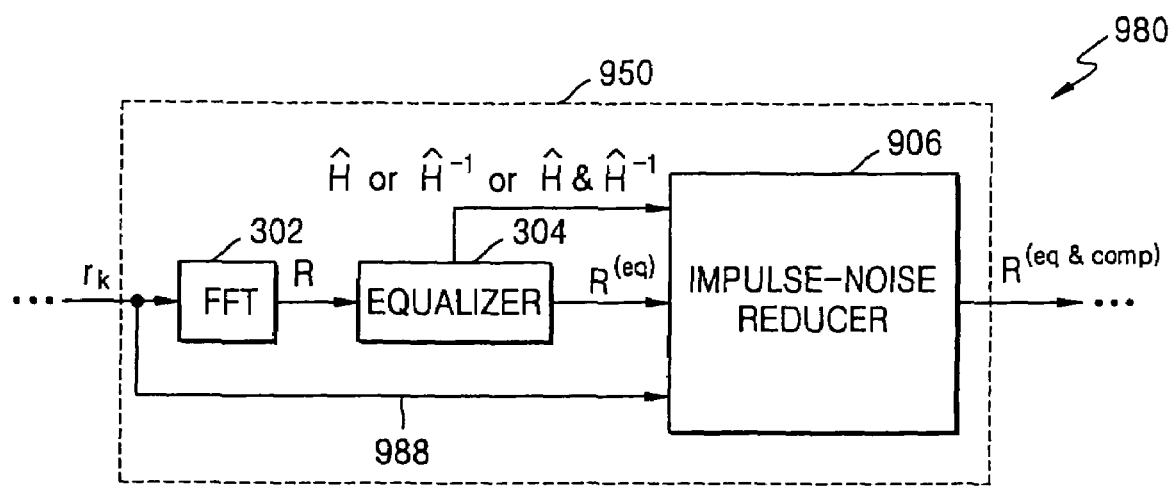

FIG. 9B is a block diagram visual-summary of a receiver, related to FIG. 9A that corresponds to FIG. 8B, according to at least one embodiment of the present invention.

Figure 10:
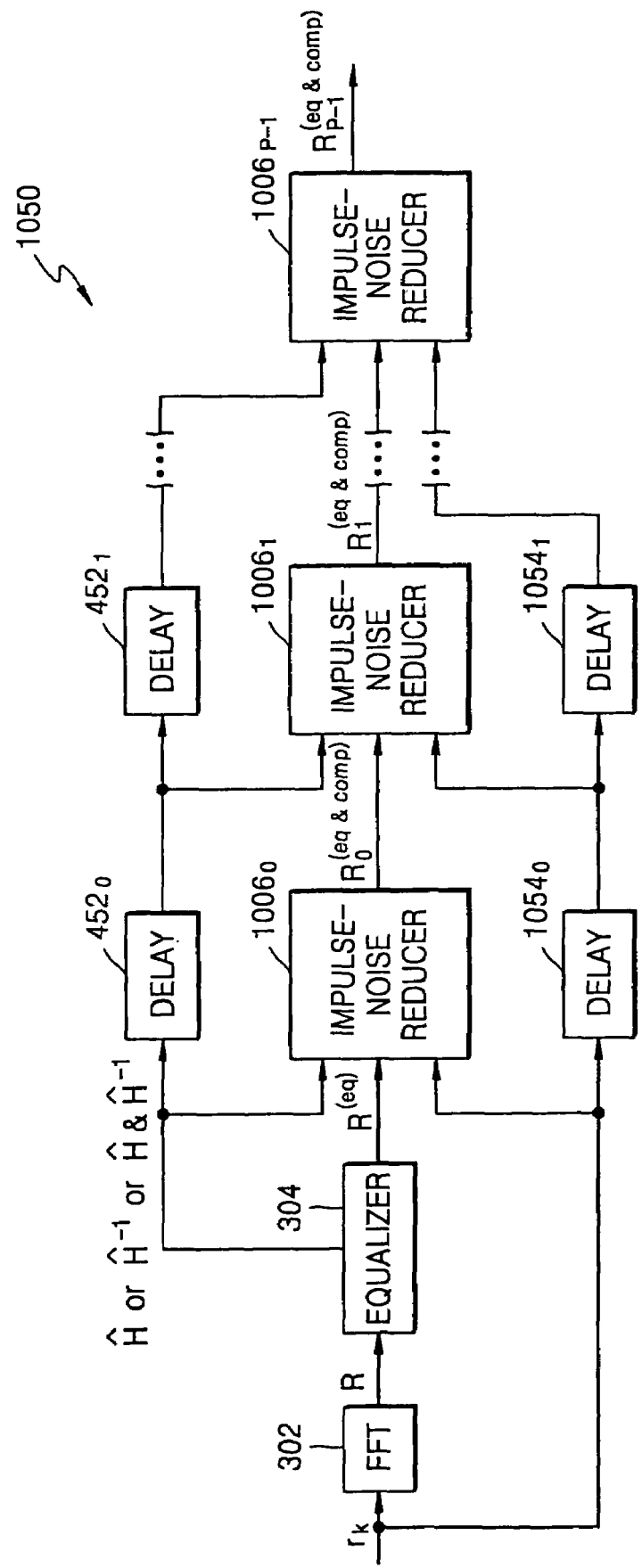

FIG. 10 is a block diagram of an FFT_&_Equalization_&_Impulse-Noise-Compensation unit according to another embodiment of the present invention.

Figure 11A:
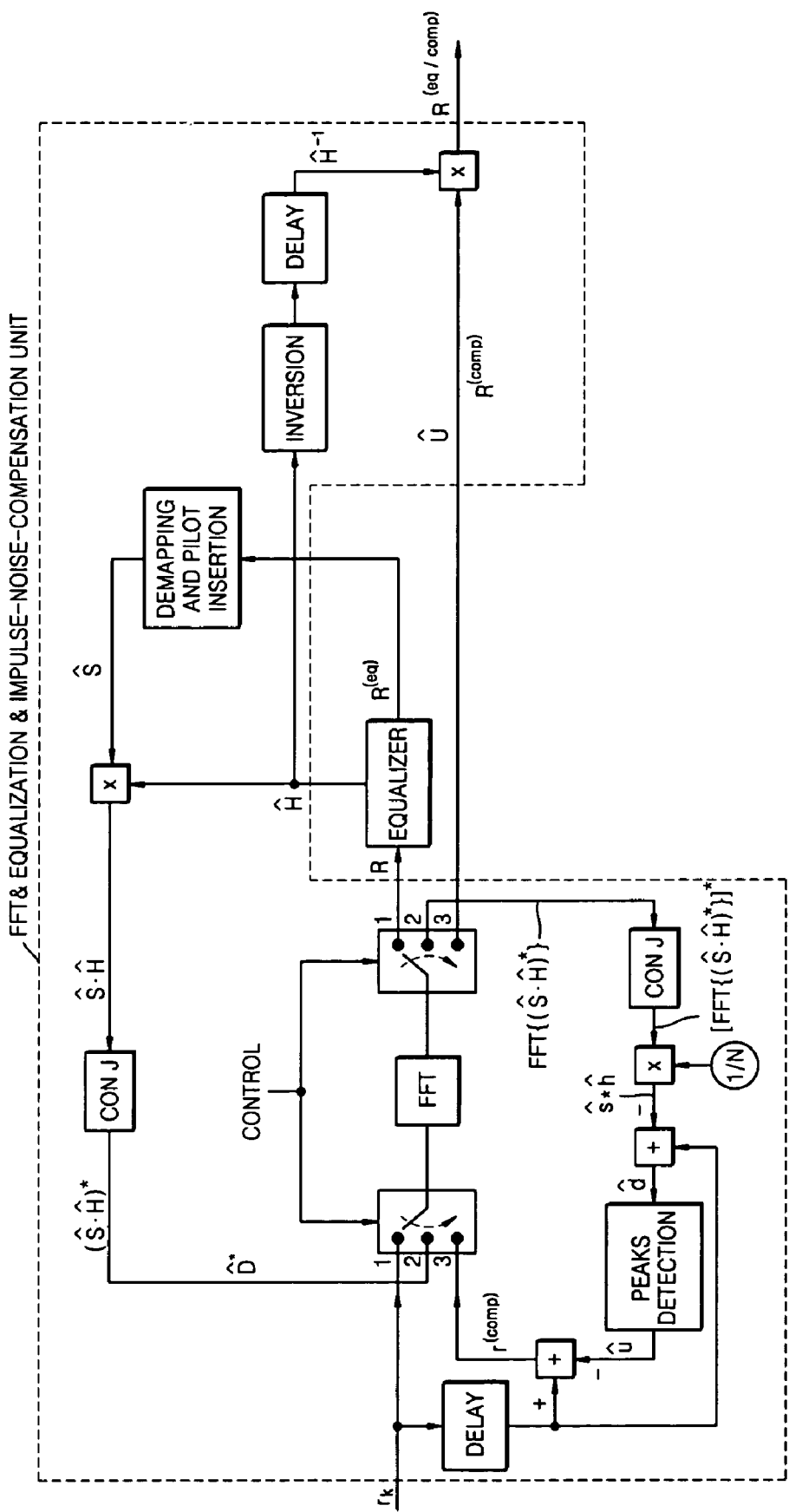

FIG. 11A is a block diagram of a FFT_&_Equalization_&_Impulse-Noise-Compensation unit according to at least one embodiment of the present invention.

Figure 11B:
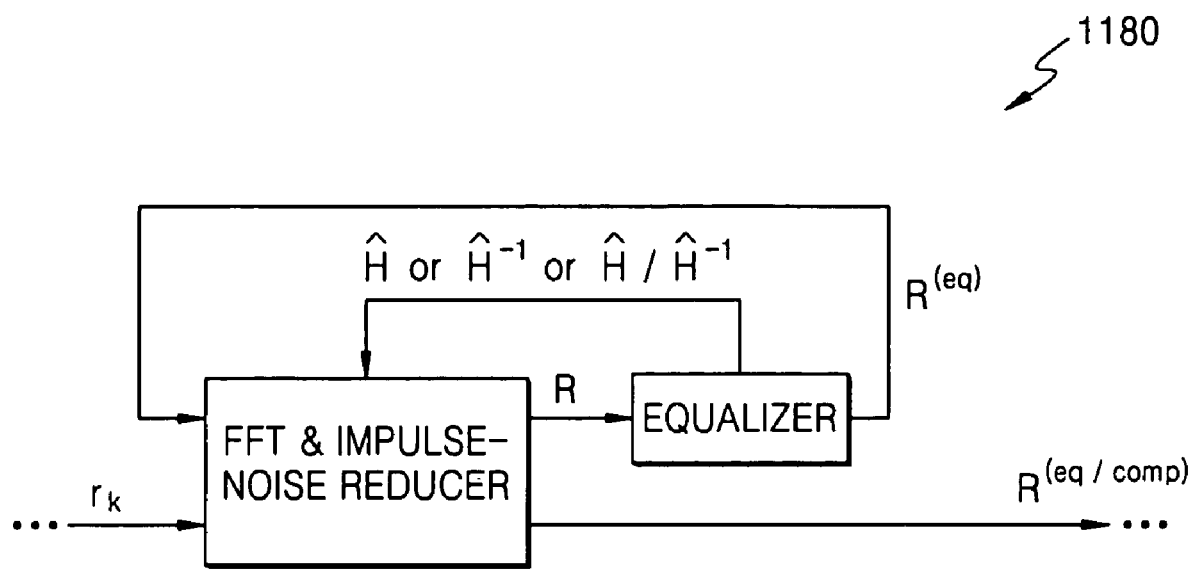

FIG. 11B is a block diagram visual-summary of a receiver, related to FIG. 11A, according to at least one embodiment of the present invention.

Figure 12A:
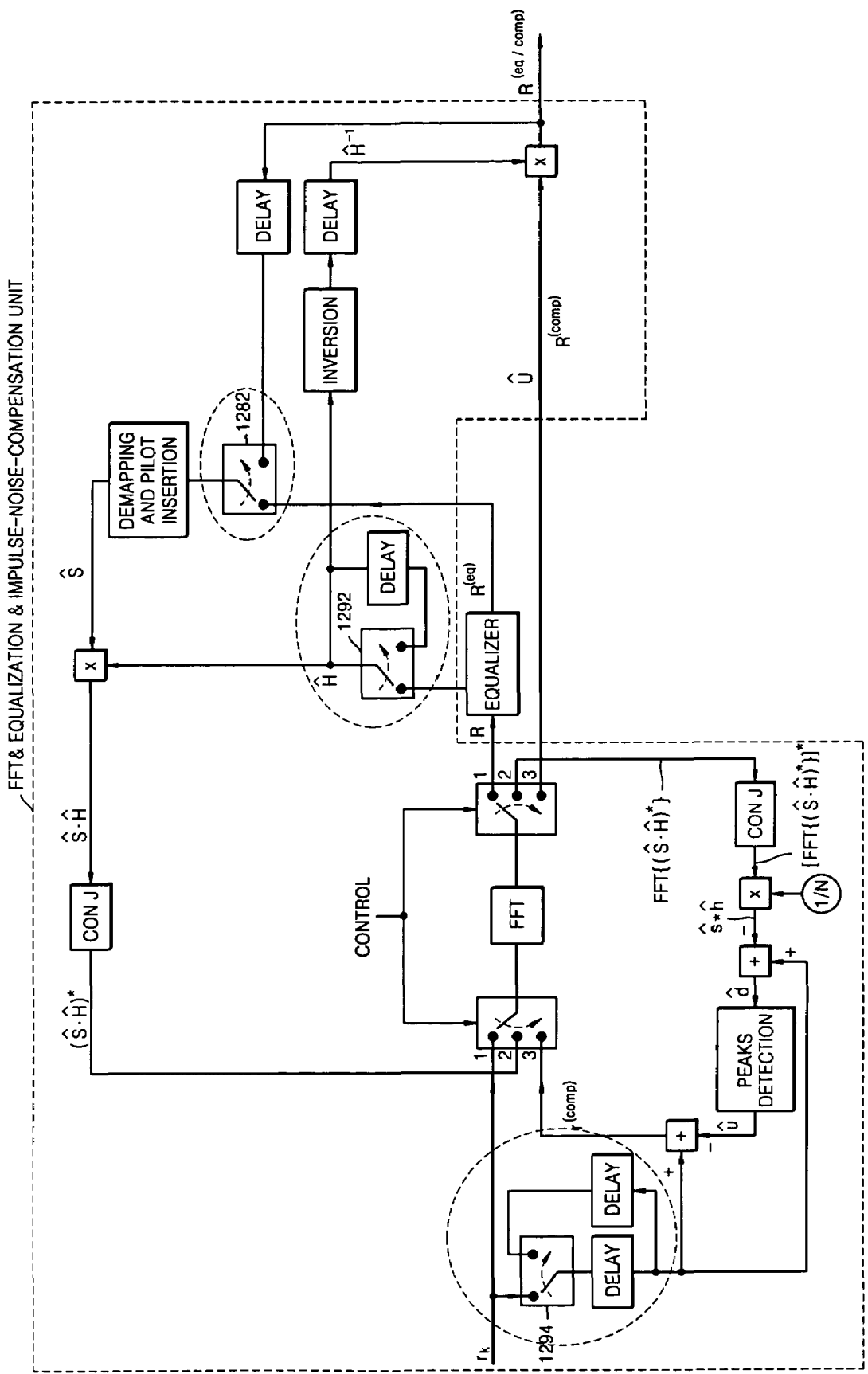

FIG. 12A is a block diagram of a FFT_&_Equalization_&_Impulse-Noise-Compensation unit according to at least one embodiment of the present invention.

Figure 12B:
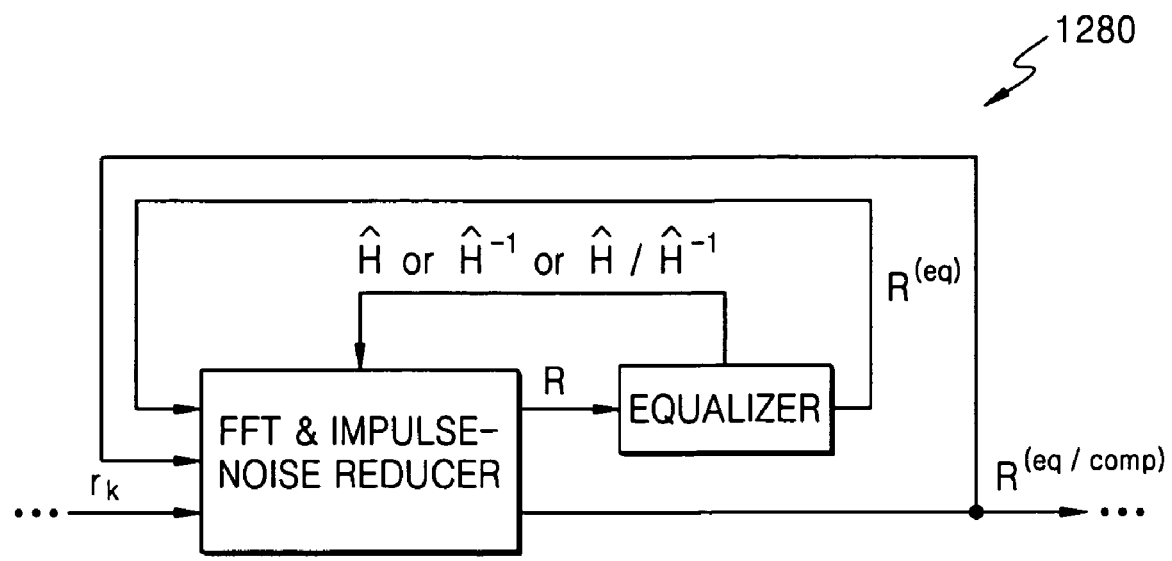

FIG. 12B is a block diagram visual-summary of a receiver, related to FIG. 12A, according to at least one embodiment of the present invention.

DETAILED DESCRIPTION OF EXAMPLE EMBODIMENTS

In developing the present invention, the following problem with the Background Art was recognized and the physics thereof was determined. Regarding pre-EQ noise-removal, much of the significant impulse noise content has magnitudes that are comparable to or less than the largest typically-expected magnitudes in the pre-EQ received MCM signal. Such lesser magnitude impulse noise masquerades as transmitted data. Pre-EQ noise-removal fails to detect (and hence fails to reduce) the masquerading impulse noise content. An aspect of the present invention is that this problem can be overcome by reducing (if not removing) impulse noise after the received MCM signal has been equalized, in other words by performing a "post-E" type of impulse noise-removal. Post-E impulse noise-removal according to an aspect of the present invention can detect (and hence can reduce, if not remove) the masquerading impulse noise content.

For a received multiple carrier modulation (MCM) signal (a frequency domain version of which is R) that corresponds to a transmitted MCM signal (a frequency domain version of which is S), and has been equalized (a "post-E" signal), embodiments of the present invention reduce impulse-noise in the post-E signal. For example, the MCM signal can be an orthogonal frequency-division multiplexing (OFDM) signal. Impulse noise in the post-E signal is estimated and then a portion of the impulse noise in the post-E signal is reduced (if not removed) according to the estimated impulse noise. The estimate of the impulse noise is based upon an approximation of the total noise in the post-E signal.

Other embodiments of the present invention remove the portion (of impulse noise in the post-E signal) also as a function of an estimated channel transfer function ($\hat{H}$). For example, this can be done by taking the matrix product (element-by-element product) of the estimated impulse noise and an inverse ($\hat{H}^{-1}$) of $\hat{H}$, and then subtracting the matrix product from the equalized signal (the frequency domain version of which is $R^{(eq)}$).

FIG. 2 is a block diagram depicting an MCM, e.g., OFDM, system 200 according to at least one embodiment of the present invention. The system 200 includes a transmitter 202 and a receiver 224. Transmitter 202 includes: a scrambling unit 204; a forward error correction (FEC) encoder 206; an interleaving unit 208; a quadrature amplitude modulation (QAM), phase-shift keying (PSK) (QAM/PSK) mapping unit 210; a pilot signal insertion unit 212; an inverse fast Fourier transform (IFFT) unit 214; and a guard-interval unit 216 to add a guard-interval. Where the communications channel is a free-space channel 222, transmitter 202 can further include a digital to analog (DAC) converter 218 and an up-converter 220; and the system 200 correspondingly includes antenna 221 (associated with transmitter 202) and antenna 223 (associated with receiver 224).

Receiver 224 includes: a guard-interval removing unit 230; a combined Fast Fourier Transform (FFT) & Equalization & Impulse-Noise-Compensation unit 250 (itself according to embodiments of the present invention); an optional de-mapping unit 236; a de-interleaving unit 238; an FEC decoder 240; and a de-scrambling unit 242. Where the communications channel is free-space channel 222, receiver 224 further includes: a down-converter 226; and an analog-to-digital converter (ADC) 228.

Typically, but not necessarily, the communication channel will be free-space channel 222; alternatively, the communications channel can be a wire, waveguide, etc. This is depicted in FIG. 2 by alternative communication channels 244 and 246. If communication channel 246 is used, then up-converter 220, antennas 221 and 223, and down-converter 226 would not be present. If communication channel 244 is used, then DAC 218 and ADC 228, as well as components 220-226, would no be present.

In MCM transmitter 202, a set of information bits passes through scrambling unit 204, FEC encoder 206, interleaving unit 208, and then is mapped into baseband symbols $\{S_k\}$ using modulation techniques such as phase-shift keying (PSK) and/or quadrature amplitude modulation (QAM) by QAM/PSK mapping unit 210. Pilot signal insertion is performed on the block of baseband signals by pilot insertion unit 212. The output of pilot insertion unit 212 is operated upon by IFFT unit 214. The output of IFFT unit 214 is operated upon by guard interval unit 216 to add guard intervals, and the resultant signal is digital-to-analog converted by DAC 218 (assuming the communications channel is either 222 or 246).

For each channel symbol interval, output of IFFT unit 214 can be represented by the following time-domain equation.

$$s(t) = \sum_{k=0}^{N-1} S_k e^{j2\pi k \Delta f t} \text{ where } 0 < t < T_s \quad (1)$$

where:

N is the number of sub-carriers in the MCM signal;

$\Delta f$ is the separation between adjacent sub-carriers; and $T_s$ is the channel symbol interval.

After passing through the communication channel, then being down-converted (assuming communication channel 222 is used) by down-converter 226, then being digitized by ADC 228, then having the guard interval removed (by unit 230), and then being synchronized, the resultant signal ($r_k$) provided to unit 250 can be described by the following discrete-time (as contrasted with continuous-time) equation.

$$r_k = h_l * s_k + n_k + u_k \quad (2)$$

where:

$k = 0, 1, \ldots, N-1$;

$s_k = s(kT_s/N)$;

$h_l$ is the impulse response of the channel ($l=1, \ldots, L$, where L is the length of channel impulse response);

$n_k$ is the additive white Gaussian noise (AWGN) term;

$u_k$ is the impulse noise interference; and

"*" denotes convolution.

FIG. 3 is a more detailed block diagram of combined FFT_&_Equalization_&_Impulse-Noise-Compensation unit 250 according to at least one embodiment of the present invention. Unit 250 includes: a FFT unit 302; an equalizer unit 304; and an impulse-noise reducer unit 306. Impulse-noise reducer unit 306 includes: total-noise measuring unit 308; impulse-noise estimating unit 310; and compensated-signal generator 312.

FFT unit 302 operates upon the received MCM signal $r_k$ that is obtained from guard unit 230 and outputs the frequency domain version R. The output R of FFT unit 302 is a series of data and pilot symbol values for each symbol encoded on the received MCM signal $r_k$. Relative to Equation No. 2, the output R can be represented in the frequency-domain by the following equation $$R = H \cdot S + N + U \quad (3)$$

where:
H is the discrete Fourier transform (DFT) of the channel's impulse response;
S is the DFT of the transmitted MCM signal;
N is the DFT of the additive white Gaussian noise (AWGN) (also known as background noise) term;
U is the DFT of the impulse noise term;
· denotes matrix (element-by-element) multiplication such that, for $S=\{S_0, S_1, \ldots\}$ and $H=\{H_0, H_1, \ldots\}$, $S \cdot H=\{S_0 H_0, S_1 H_1, \ldots\}$; and
the bold style and UPPERCASE letters indicates VECTOR NOTATION in the frequency domain.

It is assumed that the estimated channel transfer function ($\hat{H}$) provided by equalizer 304 is approximately equal to the actual channel transfer function (H), i.e. $\hat{H} \approx H$, and $\hat{H}^{-1} \approx H^{-1}$, and $H^{-1} \cdot H \approx I$, where $I=\{1,1,1\ldots,1\}$.

Equalizer unit 304 of FIG. 3 operates upon R and outputs an equalized version $R^{(eq)}$ and an estimate $\hat{H}$ of the channel impulse response to impulse-noise reducer unit 306. The following derivation yields the equation for the equalized signal $R^{eq}$:

$$R^{(eq)} = R \cdot \hat{H}^{-1} \quad (4)$$
$$= (\hat{H} \cdot S + N + U) \cdot \hat{H}^{-1}$$
$$= H \cdot S \cdot \hat{H}^{-1} + (N+U) \cdot \hat{H}^{-1}$$
$$= S + (N+U) \cdot \hat{H}^{-1}$$
$$R^{(eq)} = S + D \cdot \hat{H}^{-1}$$

where
$R^{(eq)}$ is (again) the equalized version of the received signal $\hat{H}^{-1}=\{\hat{H}_0^{-1}, \hat{H}_1^{-1}, \ldots, \hat{H}_{N-1}^{-1}\}$; and
D=N+U is the total noise in the frequency domain.

Solving Eq. No. 4 for D and substituting $\hat{H}$ for H obtains the following equation of estimated total noise, $\hat{D}$.

$$R^{(eq)} \cdot H = S \cdot H + D$$
$$R^{(eq)} \cdot H - S \cdot H = D, \text{ assume } H \approx \hat{H}$$
$$\hat{D} = (R^{(eq)} - S) \cdot \hat{H} \quad (5)$$

Total-noise measuring unit 308 produces a frequency-domain estimate of the total noise ($\hat{D}$) and includes a demapping-and-pilot-insertion-unit 314; adder 316; and multiplier 318. Impulse-noise estimating unit 310 produces a frequency-domain estimate of impulse noise $\hat{U}$ and includes: IFFT unit 322; a peaks detection unit 326; and an FFT unit 328. Compensated-signal generator 312 performs post-E impulse-noise reduction (yielding frequency-domain signal $R^{(eq\&comp)}$) and includes: an inversion unit 330; an optional delay unit 332; a multiplier 334; an optional delay unit 336; and an adder 338.

In total-noise measuring unit 308, unit 314 receives equalized signal $R^{(eq)}$ and produces an estimated version $\hat{S}$ of the transmitted MCM signal S, which gets provided to a negative input of adder 316. Adder 316 also receives equalized signal $R^{(eq)}$. In other words, adder 316 subtracts $\hat{S}$ from equalized signal $R^{(eq)}$ and outputs the difference. Multiplier 318 receives the difference $R^{(eq)}-\hat{S}$ and matrix-multiplies it with $\hat{H}$ to form an estimate of the total noise ($\hat{D}$), where $\hat{D}=(R^{(eq)}-\hat{S}) \cdot \hat{H}$. Optional delay units, such as delay unit 332, are provided to accommodate delay introduced by the Fast Fourier transformation, which is an example of delay introduced by signal processing. Such delay units are routinely added and/or manipulated (as to operating characteristics) as part of implementing signal processing technology in hardware according to the constraints of a given set of circumstances.

In impulse-noise estimating unit 310, IFFT unit 322 receives total noise estimate $\hat{D}$ and outputs the time-domain version ($\hat{d}$). Peaks-detection unit 326 operates upon the total noise estimate $\hat{d}$ and generates a time-domain estimate of its impulse noise content ($\hat{u}$). FFT unit 328 receives the time-domain impulse-noise estimate $\hat{u}=\{\hat{u}_0, \hat{u}_1, \ldots, \hat{u}_{N-1}\}$ and outputs the frequency-domain version ($\hat{U}$).

The impulse noise can be estimated as follows (in the frequency-domain).

$$\hat{U}_k = A_{t_1} e\left(j\frac{2\pi k t_1}{N}\right) + A_{t_2} e\left(j\frac{2\pi k t_2}{N}\right) + \ldots + A_{t_{N-1}} e\left(j\frac{2\pi k t_L}{N}\right) \text{ for } k=0, 1, \ldots N-1 \quad (6)$$

where
L is the number of samples in one MCM symbol effected by impulse-noise;
$t_1, t_2, \ldots, t_L$ are the positions of the samples; and
$A_1, A_2, \ldots, A_L$ are the complex amplitudes of the samples.

If both the total noise, D, and the AWGN, N, can be estimated ($\hat{D}, \hat{N}$), then the impulse noise, U, can be estimated by solving the equation D=N+U as follows.

$$\hat{U} = \hat{D} - \hat{N} \quad (7)$$

But it is not easy to distinguish N from U in the frequency domain. So Eq. No. 7 is transformed back into the time-domain via inverse fast Fourier transformation (IFFT). In terms of FIG. 3, IFFT unit 322 (again) operates upon total noise estimate $\hat{D}$ output by total-noise measuring unit 308. Operation of peaks-detection unit 326 will now be discussed.

To distinguish between impulse-noise samples $u_k$ and AWGN-noise samples $n_k$, peaks-detection unit 326 can implement a rule of distinction. Such a rule uses an estimate of the variance, $\hat{\sigma}$, of $\hat{d}$, where $\hat{\sigma}$ is given by the following equation.

$$\hat{\sigma} = \sqrt{\frac{1}{N}\sum_{k=0}^{N-1}|d_k|^2} \quad (8)$$

An example of the distinction rule implemented by peaks-detection unit 326 to distinguish between impulse noise samples $u_k$ and AWGN noise samples $n_k$ is as follows.

$$\hat{u}_k = \begin{cases} \hat{d}_k, & \text{for } |\hat{d}_k| > C\hat{\sigma} \quad k=0, 1, \ldots, N-1 \\ 0 & \text{otherwise} \end{cases} \quad (9)$$

where
C is a threshold value corresponding to a small probability of false detection.

FIG. 4 is a more detailed block diagram of peaks-detection unit 326 according to at least one embodiment of the present invention. Peaks-detection unit 326 includes: a matrix-product-squared unit 402; a unit 404 to sum elements of a matrix; a scalar multiplier 406; a comparator 408; and a selective attenuator 410.

Matrix-product-squared unit 402 receives the time-domain version $\hat{d}=\{\hat{d}_k\}$ of the total noise estimate $\hat{D}$ from IFFT unit 322 and performs matrix multiplication to take the square of $\{\hat{d}_k\}$, which is $\{|\hat{d}_k|^2\}$. Unit 404 operates upon the product from unit 402 to produce a scalar sum of the N elements in $\{|\hat{d}_k|^2\}$, which is multiplied with $$\frac{C^2}{N}$$

by multiplier 406 to produce product $C\hat{\sigma}^2$. Comparator 408 compares each $k^{th}$ member $\{|\hat{d}_k|^2\}$ against the product $C\hat{\sigma}^2$, and provides an indication each comparison to selective attenuator 410. Eq. No. 9 is implemented by unit 410, which selectively sets $\hat{u}_k=\hat{d}_k$ or $\hat{u}_k=0$ depending upon the corresponding $k^{th}$ comparison in order to produce $\{\hat{u}_k\}=\hat{u}$.

In compensated-signal generator 312, inversion unit 330 receives estimate $\hat{H}$ and outputs its inversion ($\hat{H}^{-1}$). Delay unit 332 delays inverted estimate $\hat{H}^{-1}$. In some implementations, availability of $\hat{U}$ might be delayed. Delay unit 332 can compensate for such delay.

Multiplier 334 receives the frequency-domain impulse-noise estimate $\hat{U}$ (from FFT unit 338) and delayed inverted estimate $\hat{H}^{-1}$ and multiplies them together to form an intermediate product $\hat{U}\cdot\hat{H}^{-1}$, which is provided to a negative input of adder 338. Optional delay unit 336 (which would be present if optional delay unit 332 is present) delays equalized signal $R^{(eq)}$. Adder 338 receives the delayed equalized signal $R^{(eq)}$ and, in effect, subtracts from it the intermediate product $\hat{U}\cdot\hat{H}^{-1}$ to form the difference $R^{(eq\&comp)}$, which is an equalized and impulse-noise-reduced frequency-domain version of $r_k$, and which is provided to optional demapping unit 236, or optionally directly to de-interleaving 238.

Equalized and impulse-noise-reduced signal $R^{(eq\&comp)}$ can be derived as follows, where it is assumed that $\hat{U}\approx U$.

$$\begin{aligned} R^{(eq\&comp)} &= R^{(eq)} - \hat{U}\cdot\hat{H}^{-1} \\ &= R^{(eq)} - (\hat{D}-\hat{N})\cdot\hat{H}^{-1} \\ &= R^{(eq)} - ((R^{(eq)}-\hat{S})\hat{H}-\hat{N})\cdot\hat{H}^{-1} \\ &= R^{(eq)} - (R^{(eq)}-\hat{S}) + \hat{N}\cdot\hat{H}^{-1} \\ &= \hat{S} + \hat{N}\cdot\hat{H}^{-1} \\ R^{(eq\&comp)} &= \hat{S} + \hat{N}\cdot\hat{H}^{-1} \end{aligned}$$
(10)

In FIG. 3, it is noted that equalizer unit 304 can estimate both $\hat{H}$ and $\hat{H}^{-1}$. This lends itself to alternative arrangements of FFT_&_Equalization_&_Impulse-Noise-Compensation unit 250, e.g., as follows. In an alternative embodiment according to the present invention, inversion unit 330 is not provided; instead $\hat{H}^{-1}$ can be provided directly from equalizer unit 304 to delay unit 332 via signal path 340. Another alternative embodiment according to the present invention has equalizer unit 304 providing $\hat{H}^{-1}$ but not $\hat{H}$, so an optional inversion unit 342 is included. Inversion unit 342 receives $\hat{H}^{-1}$ via signal path 344 and provides $\hat{H}$ to multiplier 318.

FIG. 5 is a block diagram of receiver 224, at a level of detail between that of FIGS. 2 and 3. As such, FIG. 5 can serve as a visual summary of the discussion of FIG. 3. In FIG. 5, equalizer 304 is shown as providing $\hat{H}$, or $\hat{H}^{-1}$ or $\hat{H}$ & $\hat{H}^{-1}$, in keeping with the discussion above concerning alternative arrangements of FFT_&_Equalization_&_Impulse-Noise-Compensation unit 250.

Though QAM/PSK mapping is performed by unit 210 of transmitter 202, demapping unit 236 is optional. If a hard-decision type of FEC decoder 240 is used, then demapping unit 236 should be present. But if a soft-decision type of FEC decoder 240 is used, then demapping unit 236 could be used but is not necessary. If interleaving unit 208 is not present in transmitter 202, then de-interleaving unit 238 correspondingly would not be present in receiver 224. Similarly, if scrambling unit 204 were not present in transmitter 202, then descrambling unit 242 would not be present in receiver 224.

An optional clipping circuit 594 is depicted in FIG. 5, via phantom signal paths, as being interposed between ADC 228 and unit 230, resulting in a variation 224' of receiver 224, according to another embodiment of the present invention. In some circumstances, amplitudes of impulse-noise are so high that the aspect of demapping performed by demapping-and-pilot-insertion unit 314 can become unreliable and the estimated impulse-noise sequence can differ significantly from the true impulse-noise sequence. This can be compensated by introducing pre-EQ noise-removal via clipping unit 594, which corresponds to clipping unit 101 of the Background Art. While pre-EQ clipping itself introduces distortion, it can be viewed as an additive impulse interference that can be compensated for by FFT_&_Equalization_&_Impulse-Noise-Compensation unit 250.

FIG. 6 is a block diagram of an FFT_&_Equalization_&_Impulse-Noise-Compensation unit 450 according to another embodiment of the present invention. Unit 450 is similar to unit 250, but adds one or more additional stages of impulse-noise reduction. The zeroith stage of impulse reduction corresponds to units 302, 304 and $406_0$, where impulse-noise reducer unit $406_0$ corresponds to impulse-noise reducer unit 306 and produces the zeroith iteration of the equalized and impulse-noise-reduced signal, namely $R_0^{(eq\&comp)}$. The first stage of impulse-noise reduction corresponds to impulse-noise reducer unit $406_1$, which operates upon $R_0^{(eq\&comp)}$ and produces the first iteration of the equalized and impulse-noise-reduced signal, namely $R_1^{(eq\&comp)}$. Unit 450 includes, as part of the first stage, an optional delay unit $452_0$ that correspondingly delays $\hat{H}$ and/or $\hat{H}^{-1}$ according to delay induced by the processing performed by unit $406_0$. Similarly, unit 450 includes, as part of the second stage, an optional delay unit $452_1$.

FIG. 6 depicts a total of P stages, the last stage being stage P-1 that includes impulse-noise reducer unit $406_{P-1}$. It is noted that stage P-1 does not include a delay unit as it is the final stage of impulse-noise reduction. In other words, in FIG. 6, there are P stages of impulse-noise reduction but P-1 delay units delay unit $452_1$. An advantage of multi-stage unit 450 is that impulse-noise estimation is not perfect, but iteratively estimating impulse-noise and correspondingly compensating cumulatively will achieve better noise reduction than a single stage of impulse-noise estimation and compensation. As a practical matter, the choice of single-stage versus multiple-stages of impulse-noise reduction depends upon the circumstances of the use to which an FFT_&_Equalization_&_Impulse-Noise-Compensation unit is applied.

FIG. 7A is a block diagram of an alternative to FFT_&_Equalization_&_Impulse-Noise-Compensation unit 250, namely FFT_&_Equalizationr_&_Impulse-Noise-Compensation unit 750, according to another embodiment of the present invention. Similarities between unit 750 and unit 250 are reflected in the reuse of the same item numbers or corresponding item numbers, e.g., 310⇌710. Unit 750 includes: Among other differences, unit 250 includes FFT units 302 and 328 and IFFR unit 322, while unit 750 does not include an IFFT unit but instead variously uses one FFT unit for both FFT and IFFT.

Unit 750 includes an FFT_&_impulse-noise-reducer unit 706 and an equalizer unit 304. FFT_&_impulse-noise-reducer unit 706 includes: FFT-Reuse_&_Impulse-Estimating unit 710; total-noise measuring unit 308; and compensated-signal generator 312. FFT-Reuse_&_Impulse-Estimating unit 710 includes: a multiplexer (mux) 760; FFT unit 762; a demultiplexer (demux) 764; matrix complex conjugate units 766 and 768; a scalar source 770; a multiplier 772; and peaks-detection unit 326.

Mux 760 and demux 764 are controlled to select the same input. During a first phase in operation of unit 710, mux 760 and demux 764 are controlled to select signals at the first input, consequently signal $r_k$ is received from guard unit 230 and operated upon by FFT unit 762, which outputs frequency domain version R. Total noise estimate $\hat{D}$ is received by conjugate unit 766, which produces the transpose $\hat{D}^*$ and provides it to the second input of mux 760.

During a second phase in operation of unit 710, mux 760 and demux 764 are controlled to select signals at the second input, consequently FFT unit 762 operates upon $\hat{D}^*$ and produces FFT($\hat{D}^*$). Conjugate unit 768 operates upon the signals on the second output of demux 764, which produces the signal [FFT($\hat{D}^*$)]. Scalar source, e.g., a location in memory, provides the scalar value $$\frac{1}{N},$$

which multiplier 772 multiplies together with signal [FFT($\hat{D}^*$)]$^*$ to form time-domain total-noise estimate $\hat{d}$ as the product. In other words, units 768-772 operate together to perform an IFFT according to the following equation.

$$IFFT(x) = \frac{1}{N}[FFT(x^*)]^* \tag{11}$$

As in unit 250, peaks-detection unit 326 operates upon $\hat{d}$ to produce time-domain impulse-noise estimate $\hat{u}$.

During a third phase in operation of unit 710, mux 760 and demux 764 are controlled to select signals at the third input, consequently FFT unit 762 operates upon $\hat{u}$ and produces frequency-domain impulse-noise estimate $\hat{U}$. The third output of demux 764 provides $\hat{U}$ to multiplier 334 in compensated-signal generator 312.

The three phases of operation of unit 710 should be completed before the next MCM symbol, e.g., OFDM symbol, appears at the first input of mux 760. Accordingly, a clock provided to FFT unit 762 as used in unit 710 can be made three times faster than the clock provided to FFT unit 302 as used in unit 250. Alternatively, delay associated with the three phases of operation of unit 710 can be compensated for by delay units 332 and 336.

In FIG. 7A, as in FIG. 3, it is noted that equalizer unit 304 can estimate both $\hat{H}$ and $\hat{H}^{-1}$. This lends itself to alternative arrangements of FFT_&_Equalization_&_Impulse-Noise-Compensation unit 750 that correspond to the alternative arrangements of unit 250 depicted in FIG. 3. Such alternative arrangements are not depicted in FIG. 7A, for simplicity of illustration. FIG. 7B is a block diagram visual-summary of a receiver 780 that corresponds to receiver 224 of FIG. 5. It is noted that components 226-230 and 236-242 of transmitter 224 are included in transmitter 780 but are not explicitly depicted in FIG. 7B, for simplicity of illustration; inclusion of components 226-230 and 236-242 is indicated by the ellipses ( . . . ). As with the depiction of equalizer 304 in FIG. 5, equalizer 304 in FIG. 7B is shown as providing $\hat{H}$, or $\hat{H}^{-1}$ or $\hat{H}$ & $\hat{H}^{-1}$, in keeping with the discussion above concerning alternative arrangements of FFT_&_Equalization_&_Impulse-Noise-Compensation unit 250.

FIG. 8A is a block diagram of a FFT_&_Equalization_&_Impulse-Noise-Compensation unit 850 according to at least one embodiment of the present invention. Unit 850 is similar to unit 450 in having multiple stages but exhibits with FFT-reuse as in unit 750.

Compensated signal generator 812 corresponds to compensated signal generator 312 but includes a multiplexer (mux) 882 interposed between equalizer unit 304 and delay unit 336. The first input of mux 882 is connected to equalizer unit 304, while the second input is feedback connected to the output of adder 338 via an optional delay unit 884.

The first phase of the zeroith stage of unit 806 is represented by mux 882 being controlled to select its first input, thereby passing $R^{(eq)}$ to delay unit 336, etc. As such, the first phase of the zeroith stage of unit 806 corresponds to the first phase in operation of unit 710. The second and third phases of the zeroith stage of unit 806 corresponds to the second and third phases in operation of unit 710.

After the zeroith stage of unit 806, mux 882 is connected to the output of delay unit 884. The connection of mux 882 to delay unit 884 is maintained in the stages of unit 806 that follow. A clock provided to FFT unit 762 (within unit 710) is also used in unit 850 but should be made 2M+1 times faster than the clock provided to FFT unit 302 used in unit 250.

Also, mux 890 and an optional delay unit 892 are included for delay of $\hat{H}$ during iteration operations similar to the inclusion of delay units 452$i$ in FIG. 6. In the zeroith stage, mux 890 connects to equalizer 304. In stages that follow, mux 890 connects to delay unit 892.

Alternatively, because the equalizer 304 itself may have memory to store channel estimation, mux 890 and delay unit 892 may be implemented inside equalizer 304.

Similarly, the zeroith stage of impulse reduction via unit 850 operates upon $R^{(eq)}$ and produces the zeroith iteration of the equalized and impulse-noise-reduced signal, namely $R_0^{(eq\&comp)}$. The first stage of impulse-noise reduction operates upon $R_0^{(eq\&comp)}$ and produces the first iteration of the equalized and impulse-noise-reduced signal, namely $R_1^{(eq\&comp)}$; etc. Again, an advantage of multi-stage unit 450 is that impulse-noise estimation is not perfect, but iteratively estimating impulse-noise and correspondingly compensating cumulatively will achieve better noise reduction than a single stage of impulse-noise estimation and compensation. As a practical matter, the choice of single-stage versus multiple-stages of impulse-noise reduction depends upon the circumstances of the use to which an FFT_&_Equalization_&_Impulse-Noise-Compensation unit is applied.

FIG. 8B is a block diagram visual-summary of a receiver 880 that corresponds to receiver 780 of FIG. 7B. As with the depiction of equalizer 304 in FIG. 7B, equalizer 304 in FIG. 8B is shown as providing $\hat{H}$, or $\hat{H}^{-1}$ or $\hat{H}$ & $\hat{H}^{-1}$. Also, a feedback path 886 represents the second, third, etc. stages of unit 850.

Impulse-noise compensation can also take place in the time-domain via FFT_&_Equalization_&_Impulse-Noise-Compensation unit 950 of FIG. 9A, according to another embodiment of the present invention. Unit 950 is has similarities to FFT_&_Equalization_&_Impulse-Noise-Compensation unit 250, as reflected in the reuse of the same item numbers or corresponding item numbers, e.g., 308⟵⟶908. Unit 950 includes: FFT unit 302; equalizer unit 304; and an impulse-noise reducer unit 906. Impulse-noise reducer unit 906 includes: total-noise measuring unit 908; impulse-noise estimating unit 911; and compensated signal generator 913.

Total-noise measuring unit 908 produces a time-domain estimate of the total noise ($\hat{d}$) and includes a demapping and pilot-insertion unit 314; a multiplier 919; IFFT unit 322; and an adder 917. Impulse-noise estimating unit 911 produces a time-domain estimate of impulse noise content $\hat{u}$ and includes peaks-detection unit 326. Compensated-signal generator 913 produces frequency-domain equalized and compensated signal $R^{(eq\&comp)}$ and includes: an adder 939; an FFT unit 929; optional delay unit 330; inversion unit 332; and a multiplier 935.

Recalling Eq. No. 2 and $d_k = n_k - u_k$, then solving for $n_k$, time-domain total-noise estimate $\hat{d}$ can be derived as follows.

$$r_k = h_l * s_k + (d_k - u_k) + u_k \quad (12)$$
$$= h_l * s_k + d_k$$
$$\Downarrow$$
$$\hat{d}_k = r_k - (\hat{s}_k * \hat{h}_k)$$
$$= r_k - IFFT(\hat{S} \cdot \hat{H}), \text{ where } k = 0, 1, \ldots, N-1$$

In total-noise measuring unit 908, unit 314 receives equalized signal $R^{(eq)}$ and produces an estimated version $\hat{S}$ of the transmitted MCM signal S, which gets provided to multiplier 919, which multiplies it together with $\hat{H}$ to form frequency domain matrix product $\hat{S} \cdot \hat{H}$. That product is transformed by IFFT unit 332 into the time-domain version $\hat{s}*\hat{h}$, where "*" denotes convolution and provided to a negative input of adder 917. Adder 917 also receives, via optional delay unit 937, a delayed version of $r_k$. In other words, adder 917 subtracts $\hat{s}*\hat{h}$ from equalized signal $r_k$ and outputs the difference, which is time-domain estimate of the total-noise $\hat{d}$. If IFFT unit 332 introduces delay, then delay unit 937 is provided, and correspondingly so is delay unit 330.

Peaks-detection unit 326 of impulse-noise estimating unit 911 receives $\hat{d}$ and generates the time-domain estimate of its impulse noise content $\hat{u}$.

A negative input of adder 939 of compensated signal generator 913 receives the time-domain estimate of impulse noise content $\hat{u}$. Adder 939 also receives, via delay unit 937, the delayed version of $r_k$. In other words, adder 939 subtracts $\hat{u}$ from equalized signal $r_k$ and outputs the difference, which is time-domain compensated signal $r^{(comp)}$. FFT unit 929 receives $r^{(comp)}$ and produces the frequency-domain version $R^{(comp)}$. Optional delay unit 330 receives and delays $\hat{H}$. Inversion unit 332 operates upon the delayed version of $\hat{H}$ and outputs delayed ($\hat{H}^{-1}$). Multiplier 935 receives $R^{(comp)}$ and matrix-multiplies it with delayed $\hat{H}^{-1}$ to form frequency-domain equalized and compensated signal $R^{(eq\&comp)}$.

In FIG. 9A, as in FIG. 3, it is noted that equalizer unit 304 can estimate both $\hat{H}$ and $\hat{H}^{-1}$. This lends itself to alternative arrangements of FFT_&_Equalization_&_Impulse-Noise-Compensation unit 950 that correspond to the alternative arrangements of unit 250 depicted in FIG. 3. Such alternative arrangements are not depicted in FIG. 9A, for simplicity of illustration. FIG. 9B is a block diagram visual-summary of a receiver 980 that corresponds to receiver 224 of FIG. 5. It is noted that components 226-230 and 236-242 of receiver 224 are included in transmitter 980 but are not explicitly depicted in FIG. 9B, for simplicity of illustration; inclusion of components 226-230 and 236-242 is indicated by the ellipses ( . . . ). As with the depiction of equalizer 304 in FIG. 5, equalizer 304 in FIG. 9B is shown as providing $\hat{H}$, or $\hat{H}^{-1}$ or $\hat{H}$ & $\hat{H}^{-1}$. Also, a feed-forward path 988 represents received MCM signal $r_k$ being directly input to unit 950 (via optional delay unit 937, etc.).

FIG. 10 is a block diagram of a FFT_&_Equalization_&_Impulse-Noise-Compensation unit 1050 according to at least one embodiment of the present invention. Unit 1050 is similar to unit 450 in terms of being multi-staged. The zeroith stage of impulse reduction corresponds to units 302, 304 and $1006_0$, where impulse-noise reducer unit $1006_0$ produces the zeroith iteration of the equalized and impulse-noise-reduced signal, namely $R_0^{(eq\&comp)}$. The first stage of impulse-noise reduction corresponds to impulse-noise reducer unit $1006_1$, which operates upon $R_0^{(eq\&comp)}$ and produces the first iteration of the equalized and impulse-noise-reduced signal, namely $R_1^{(eq\&comp)}$. Unit 1050 includes, as part of the first stage, a delay unit $452_0$ that correspondingly delays $\hat{H}$ and/or $\hat{H}^{-1}$ and an optional delay unit $1054_0$ that correspondingly delays $r_k$, according to delay induced by the processing performed by unit $1006_0$. Similarly, unit 450 includes, as part of the second stage, delay unit $452_1$ and optional delay unit $1054_1$.

FIG. 10 depicts a total of P stages, the last stage being stage P−1 that includes impulse-noise reducer unit $1006_{P-1}$. It is noted that stage P−1 does not include delay units as it is the final stage of impulse-noise reduction. In other words, in FIG. 6, there are P stages of impulse-noise reduction but P−1 delay units $452_1$ and $1054_1$. An advantage of multi-stage unit 1050 is that impulse-noise estimation is not perfect, but iteratively estimating impulse-noise and correspondingly compensating cumulatively will achieve better noise reduction than a single stage of impulse-noise estimation and compensation. Again, as a practical matter, the choice of single-stage versus multiple-stages of impulse-noise reduction depends upon the circumstances of the use to which an FFT_&_Equalization_&_Impulse-Noise-Compensation unit is applied.

FIG. 11A is a block diagram of an alternative FFT_&_Equalization_&_Impulse-Noise-Compensation unit (relative to unit 950), according to at least one embodiment of the present invention. The FFT unit in FIG. 11A is re-used similarly to how FFT unit 762 is re-used in FIG. 7A.

FIG. 11B is a block diagram visual-summary of a receiver 1180, related to FIG. 11A, according to at least one embodiment of the present invention.

FIG. 12A is a block diagram of an alternative FFT_&_Equalization_&_Impulse-Noise-Compensation unit (relative to the corresponding unit in FIG. 11A), according to at least one embodiment of the present invention. The FFT unit in FIG. 12A is re-used similarly to how the FFT unit of FIG. 11A is re-used. Relative to FIG. 11A, muxes 1282, 1292 and 1294 are included in FIG. 12A, which permits the FFT_&_Equalization_&_Impulse-Noise-Compensation unit of FIG. 12A to perform iterations in time in a manner corresponding to unit 1050 of FIG. 10.

FIG. 12B is a block diagram visual-summary of a receiver 1280, related to FIG. 12A, according to at least one embodiment of the present invention.

The operation of FIG. 11A and FIG. 12A similarly, respectively, similar to that of FIG. 9A, FIG. 10, FIG. 7A and FIG. 8A, thus detailed explanations are omitted herein for brevity.

It is noted that each of the receivers, e.g., 780, 880, 980, 1180 and 1280 can also be modified to include optional clipping circuit 594 resulting in receiver variations 780', 880', 980', 1180' and 1280', according to other embodiments of the present invention.

Embodiments of the present invention perform better than the Background Art. For example, embodiments of the present invention can enjoy up to about 5 dB relative improvement in symbol error rate percentage for a given symbol as compared to the Background Art. Also, the relative improvement is inversely (and approximately linearly) proportional to a ratio of signal to total noise.

The present invention being thus described, it will be obvious that the same may be varied in many ways. Such variations are not to be regarded as a departure from the spirit and scope of the present invention, and all such modifications are intended to be included within the scope of the present invention.

I claim:

1. A method of reducing noise in a multiple carrier modulated (MCM) signal that has been equalized, the method comprising:
   estimating impulse noise in the equalized signal; and
   removing a portion of the noise from the equalized signal as a function of the estimated impulse noise;
   wherein estimating the impulse noise comprises:
   estimating total noise in the equalized signal; and
   estimating the impulse noise based on the estimated total noise.

2. The method of claim 1, wherein the MCM signal is an orthogonal frequency-division multiplexing (OFDM) signal.

3. The method of claim 1, wherein removing the portion of the noise also removes the portion of the noise from the equalized signal as a function of an estimated channel transfer function ($\hat{H}$).

4. The method of claim 3, wherein removing the portion of the noise comprises:
   taking a matrix product of the estimated impulse noise and an inverse ($\hat{H}^{-1}$) of the estimated channel transfer function ($\hat{H}$); and
   subtracting the matrix product from the equalized signal.

5. The method of claim 3, wherein removing the portion of the noise comprises:
   subtracting a time-domain estimated impulse noise from a received signal to form a time-domain compensated received signal.

6. The method of claim 5, wherein removing the portion of the noise further comprises:
   taking a fast Fourier transform (FFT) of the time-domain compensated received signal to produce a frequency-domain version of the time-domain compensated received signal; and
   taking a product of the frequency-domain version of the time-domain compensated received signal and an inverse ($\hat{H}^{-1}$) of the estimated channel transfer function ($\hat{H}$).

7. The method of claim 1, wherein at least part of removing the portion of the noise takes place in a frequency domain.

8. The method of claim 1, wherein at least part of removing the portion of the noise takes place in a time domain.

9. The method of claim 1, wherein at least part of estimating the impulse noise takes place in a time domain.

10. The method of claim 1, wherein estimating the impulse noise further comprises:
    using peak-detection to produce a time-domain version of the estimated impulse noise based on a time-domain version of the estimated total noise.

11. The method of claim 1, wherein at least part of estimating the total noise takes place in a frequency domain.

12. The method of claim 1, wherein estimating the total noise comprises:
    estimating a baseband signal that includes a set of transmitted symbols;
    subtracting the estimated baseband signal from the equalized signal to form a set of differences; and
    multiplying the set of differences by an estimated channel transfer function ($\hat{H}$).

13. The method of claim 1, wherein at least part of estimating the total noise takes place in a time domain.

14. The method of claim 1, wherein estimating the total noise comprises:
    estimating a baseband signal that includes a set of transmitted symbols;
    taking a matrix product of the estimated baseband signal and an estimated channel transfer function ($\hat{H}$) to form a frequency-domain product;
    taking an inverse fast Fourier transform (IFFT) of the frequency-domain product to form a time-domain version of the frequency-domain product; and
    subtracting the time-domain version of the frequency-domain product from a received signal to form a time-domain version of the estimated total noise.

15. The method of claim 1, wherein estimating the impulse noise and removing the portion of the noise can be performed iteratively,
    wherein a first iteration results in a first noise-reduced version of the equalized signal,
    wherein the method further comprises making a second iteration of estimating the impulse noise and removing the portion of the noise in which estimating the impulse noise operates on the first noise-reduced version of the equalized signal, and
    wherein the second iteration produces a second noise-reduced version of the equalized signal that has a lower noise content than the first noise-reduced version.

16. The method of claim 15, further comprising:
    making a third iteration of estimating the impulse noise and removing the portion of the noise in which estimating the impulse noise operates on the second noise-reduced version of the equalized signal;
    wherein the third iteration produces a third noise-reduced version of the equalized signal that has a lower noise content than the second noise-reduced version.

17. The method of claim 1, further comprising:
    clipping, prior to equalizing the MCM signal, peaks of the MCM signal above a threshold;
    wherein the equalized signal is an equalized version of the clipped MCM signal.

18. The method of claim 17, wherein clipping the peaks of the MCM signal above the threshold clips the MCM signal to either a threshold level or to zero.

19. An apparatus for reducing noise in a received multiple carrier modulated (MCM) signal, the apparatus comprising:
    a Fourier transformer operable on the received MCM signal;
    an equalizer operable to equalize a Fourier-transformed signal from the Fourier transformer;
    a total-noise estimator operable to estimate total noise in the equalized signal from the equalizer;
    an impulse-noise estimator operable to estimate impulse noise based on the estimated total noise; and a noise compensator operable to remove a portion of impulse noise from the equalized signal as a function of the estimated impulse noise.

20. The apparatus of claim 19, wherein the MCM signal is an orthogonal frequency-division multiplexing (OFDM) signal.

21. The apparatus of claim 19, wherein the noise compensator also is operable to remove the portion of the impulse noise from the equalized signal as a function of an estimated channel transfer function ($\hat{H}$).

22. The apparatus of claim 21, wherein the noise compensator further is operable to remove the portion of the impulse noise by:
    taking a matrix product of the estimated impulse noise and an inverse ($\hat{H}^{-1}$) of the estimated channel transfer function ($\hat{H}$); and
    subtracting the matrix product from the equalized signal.

23. The apparatus of claim 21, wherein the noise compensator further is operable to remove the portion of the impulse noise by:
    subtracting a time-domain estimated impulse noise from the received MCM signal to form a time-domain compensated signal.

24. The apparatus of claim 23, wherein the noise compensator further is operable to:
    take a fast Fourier transform (FFT) of the time-domain compensated signal to produce a frequency-domain version of the time-domain compensated signal; and
    take a product of the frequency-domain version of the time-domain compensated signal and an inverse ($\hat{H}^{-1}$) of the estimated channel transfer function ($\hat{H}$).

25. The apparatus of claim 19, wherein at least part of the removal by the noise compensator takes place in a frequency domain.

26. The apparatus of claim 19, wherein at least part of the removal by the noise compensator takes place in a time domain.

27. The apparatus of claim 19, wherein the impulse-noise estimator is operable to estimate the impulse noise in a time domain.

28. The apparatus of claim 27, wherein the impulse-noise estimator further is operable to estimate the impulse noise by:
    using peak-detection to produce a time-domain version of the estimated impulse noise based on a time-domain version of the estimated total noise.

29. The apparatus of claim 19, wherein the total-noise estimator is operable to provide the estimated total noise in a frequency domain.

30. The apparatus of claim 29, wherein the total-noise estimator further is operable to estimate the total noise by:
    estimating a baseband signal that includes a set of transmitted symbols;
    subtracting the estimated baseband signal from the equalized signal to form a set of differences; and
    multiplying the set of differences by an estimated channel transfer function ($\hat{H}$).

31. The apparatus of claim 19, wherein the total-noise estimator is operable to provide the estimated total noise in a time domain.

32. The apparatus of claim 31, wherein the total-noise estimator further is operable to estimate the total noise by:
    estimating a baseband signal that includes a set of transmitted symbols;
    taking a matrix product of the estimated baseband signal and an estimated channel transfer function ($\hat{H}$) to form a frequency-domain product;
    taking an inverse fast Fourier transform (IFFT) of the frequency-domain product to form a time-domain version of the frequency-domain product; and
    subtracting the time-domain version of the frequency-domain product from a received signal to form a time-domain version of the estimated total noise.

33. The apparatus of claim 19, wherein one of the following applies:
    the equalizer is operable to determine an inverse ($\hat{H}^{-1}$) of an estimated channel transfer function ($\hat{H}$) and the noise compensator is operable to invert the inverse ($\hat{H}^{-1}$) to produce the estimated channel transfer function ($\hat{H}$);
    the equalizer is operable to determine the estimated channel transfer function ($\hat{H}$) and the noise compensator is operable to produce the inverse ($\hat{H}^{-1}$); or
    the equalizer is operable to produce both the inverse ($\hat{H}^{-1}$) and the estimated channel transfer function ($\hat{H}$).

34. The apparatus of claim 33, wherein the total-noise estimator, the impulse-noise estimator, and the noise compensator are arranged in a first stage,
    wherein the first stage is operable to output a first noise-reduced version of the equalized signal, and
    wherein the apparatus further comprises at least a second stage that includes:
        a second total-noise estimator operable on the first noise-reduced version of the equalized signal fed back to the second total-noise estimator;
        a second impulse-noise estimator; and
        a second noise compensator operable to output a second noise-reduced version of the equalized signal that has a lower noise content than the first noise-reduced version of the equalized signal.

35. The apparatus of claim 34, wherein the second total-noise estimator also is operable on a received signal fed forward to the second total-noise estimator.

36. The apparatus of claim 34, wherein the apparatus further comprises at least a third stage that includes:
    a third total-noise estimator operable on the second noise-reduced version of the equalized signal fed back to the third total-noise estimator;
    a third impulse-noise estimator; and
    a third noise compensator operable to output a third noise-reduced version of the equalized signal that has a lower noise content than the second noise-reduced version of the equalized signal.

37. The apparatus of claim 36, wherein the third total-noise estimator also is operable on a received signal fed forward to the third total-noise estimator.

38. The apparatus of claim 19, further comprising:
    a first fast Fourier transformer (FFTR) configured to provide a frequency-domain version of a received signal to the equalizer;
    wherein the impulse-noise estimator includes an inverse fast Fourier transformer (IFFTR) and a second FFTR,
    wherein the IFFTR provides a time-domain version of the estimated total noise,
    wherein the impulse-noise estimator is operable to provide a time-domain estimate of the impulse noise based on the time-domain version of the estimated total noise, and
    wherein the second FFTR is operable to provide a frequency-domain version of the time-domain estimated impulse noise.

39. The apparatus of claim 19, wherein the impulse-noise estimator is operable, in part, to make an inverse fast Fourier transformation (IFFT),
    wherein the noise compensator is operable, in part, to make a fast Fourier transformation (FFT), wherein the apparatus further comprises a fast Fourier transformer (FFTR), wherein the apparatus is configured to selectively connect the FFTR according to at least three layouts, wherein a first layout has connections such that operation of the FFTR can provide a frequency-domain version of the received MCM signal to the equalizer, wherein a second layout has connections such that operation of the FFTR can form a part of the IFFT, and wherein a third layout has connections such that operation of the FFTR can form a part of the FFT.

40. The apparatus of claim 39, wherein the first, second, and third layouts are part of a first arrangement, wherein the first arrangement is operable to output a first noise-reduced version of the equalized signal, wherein the apparatus further is operable to selectively adopt at least a second arrangement in which the second layout operates on the first noise-reduced version of the equalized signal fed back to the second layout, and wherein the noise compensator in the second arrangement is operable to output a second noise-reduced version of the equalized signal that has a lower noise content than the first noise-reduced version of the equalized signal.

41. The apparatus of claim 40, wherein the apparatus further is operable to selectively adopt at least a third arrangement in which the third layout operates on the second noise-reduced version of the equalized signal fed back to the third layout, and wherein the noise compensator in the third arrangement is operable to output a third noise-reduced version of the equalized signal that has a lower noise content than the second noise-reduced version of the equalized signal.

42. An apparatus for reducing noise in a multiple carrier modulated (MCM) signal, the apparatus comprising:

a down-converter;

an analog-to-digital converter configured to digitize output of the down-converter;

a guard-interval removing unit operable on the digitized output of the down-converter; and a combined fast Fourier transform (FFT), equalization, and impulse-noise-compensation unit operable to equalize a signal from the guard-interval removing unit, to estimate an impulse noise in the equalized signal, and to remove the estimated impulse noise from the equalized signal;

wherein the combined FFT, equalization, and impulse-noise-compensation unit comprises:

an equalizer operable on the signal from the guard-interval removing unit;

a total-noise estimator operable on a signal from the equalizer;

an impulse-noise estimator operable on a signal from the total-noise estimator; and a noise compensator operable on the signal from the equalizer and the signal from the impulse-noise estimator.

43. The apparatus of claim 42, wherein the MCM signal is an orthogonal frequency-division multiplexing (OFDM) signal.

44. A method of reducing noise in a received multiple carrier modulated (MCM) signal that has been partially equalized, the method comprising:

estimating impulse noise based on the partially-equalized received MCM signal; and removing a portion of the noise in the partially-equalized received MCM signal in a time domain as a function of the estimated impulse noise;

wherein estimating the impulse noise comprises:

estimating total noise in the partially-equalized received MCM signal; and estimating the impulse noise based on the estimated total noise.

45. The method of claim 44, wherein removing the portion of the noise in the received partially-equalized MCM signal produces a time-domain compensated signal, and wherein the method further comprises:

equalizing a frequency-domain version of the time-domain compensated signal.

46. The method of claim 45, wherein equalizing the frequency-domain version of the time-domain compensated signal equalizes as a function of an estimated channel transfer function ($\hat{H}$).

* * * * *